US011479416B2

(12) United States Patent
Martono et al.

(10) Patent No.: US 11,479,416 B2
(45) Date of Patent: Oct. 25, 2022

(54) INSPECTION SYSTEM

(71) Applicant: ACCENTURE GLOBAL SOLUTIONS LIMITED, Dublin (IE)

(72) Inventors: Christian Martono, Singapore (SG); Teck Leng Neo, Singapore (SG)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 1025 days.

(21) Appl. No.: 16/180,789

(22) Filed: Nov. 5, 2018

(65) Prior Publication Data

US 2019/0135552 A1  May 9, 2019

Related U.S. Application Data

(60) Provisional application No. 62/583,337, filed on Nov. 8, 2017.

(51) Int. Cl.
| | |
|---|---|
| *B65G 43/02* | (2006.01) |
| *G01N 29/14* | (2006.01) |
| *G01J 5/00* | (2022.01) |
| *G01N 21/88* | (2006.01) |
| *B64F 1/36* | (2017.01) |
| *G05B 23/02* | (2006.01) |
| *B65G 43/00* | (2006.01) |
| *G01N 29/44* | (2006.01) |
| *G01J 5/48* | (2022.01) |

(52) U.S. Cl.
CPC .............. *B65G 43/02* (2013.01); *B64F 1/368* (2013.01); *B65G 43/00* (2013.01); *G01J 5/00* (2013.01); *G01N 21/88* (2013.01); *G01N 29/14* (2013.01); *G01N 29/4427* (2013.01); *G05B 23/0283* (2013.01); *B65G 2203/0275* (2013.01); *B65G 2203/0291* (2013.01); *B65G 2203/042* (2013.01); *B65G 2203/044* (2013.01); *B65G 2203/045* (2013.01); *B65G 2203/046* (2013.01); *B65G 2207/40* (2013.01); *G01J 5/48* (2013.01)

(58) Field of Classification Search
CPC ........... B65G 43/02; G01J 5/00; G01N 21/88; G01N 29/14
See application file for complete search history.

(56) References Cited

U.S. PATENT DOCUMENTS

| | | | |
|---|---|---|---|
| 6,907,799 B2 * | 6/2005 | Jacobsen | G01N 29/045 73/865.8 |
| 2016/0347248 A1 * | 12/2016 | Manci | G01C 21/206 |
| 2016/0379102 A1 * | 12/2016 | Ferguson | G06Q 10/08 235/385 |

* cited by examiner

*Primary Examiner* — Bryan Bui
(74) *Attorney, Agent, or Firm* — Mannava & Kang, P.C.

(57) ABSTRACT

Examples of non-invasive inspection of a mechanical system are described. In an example implementation, a first operational data from a detector mounted on an item being handled by a mechanical system is retrieved. The detector may include one or more sensors, and the first operational data is indicative of a current operational condition of the mechanical system. The first operational data can be compared with a corresponding historical first operational data and an error in the current operational condition of the mechanical system is determined based on the comparison. In response to the identification of the error, a notification is generated to perform a non-invasive inspection of the mechanical system.

17 Claims, 19 Drawing Sheets ness of the inspection of such mechanical systems due to the manual nature of the inspection. Further, sometimes the systems may be in proper working order and may not require an inspection. Unnecessary inspection of the system may be a waste of time and money. Indeed, many a times, the systems to be inspected need to be taken out of service for a manual inspection. Doing so may lead to disruptions in operation of the service provided by the system.

INSPECTION SYSTEM

PRIORITY CLAIM

The present application claims priority from U.S. Provisional application No. 62/583,337 filed on Nov. 8, 2017, the disclosure of which is incorporated by reference in its entirety.

TECHNICAL FIELD

The present disclosure relates to inspection techniques and, in particular, relates to systems and methods for the non-invasive inspection of a system.

BACKGROUND

Any entity that handles a large number of items such as, for example, baggage, usually has systems, such as baggage handling systems for the handling of the items. Baggage handling systems can include, for example, conveyor belts, for carrying the baggage from one location to another. One such example may be an airport. Places such as airports deal with a large volume of baggage on a daily basis and any disruption in operation of the baggage handling systems may lead to flight delays, passenger complaints, and/or lost revenue. Therefore, mechanical systems, such as the baggage handling systems, have to be monitored and inspected at regular intervals, for example, once in a day. Currently, the monitoring and the inspection of such mechanical systems are performed manually. In particular, an inspector may use his/her sense of sight, hearing, smell, and touch to monitor and inspect the mechanical systems. For example, the inspector may smell an over-burnt motor or a worn-out rubber strap of a belt conveyor.

In a place like the airport where such mechanical systems are deployed, considering security parameters associated with such a place, inspection personnel may have to be checked or frisked every time they have to inspect the baggage handling systems. This may be an inconvenient and time-intensive process. Furthermore, because the inspection is usually performed once in predefined time duration, any fault or error in operation of the mechanical systems cannot be detected in real time, which may make the mechanical systems prone to failures or irreparable damages. In addition, there exists a possibility of error in the inspection of such mechanical systems due to the manual nature of the inspection. Further, sometimes the systems may be in proper working order and may not require an inspection. Unnecessary inspection of the system may be a waste of time and money. Indeed, many a times, the systems to be inspected need to be taken out of service for a manual inspection. Doing so may lead to disruptions in operation of the service provided by the system.

BRIEF DESCRIPTION OF THE DRAWINGS

Features of the present disclosure are illustrated by way of examples shown in the following figures. In the following figures, like numerals indicate like elements, in which.

DETAILED DESCRIPTION

Figure 1:
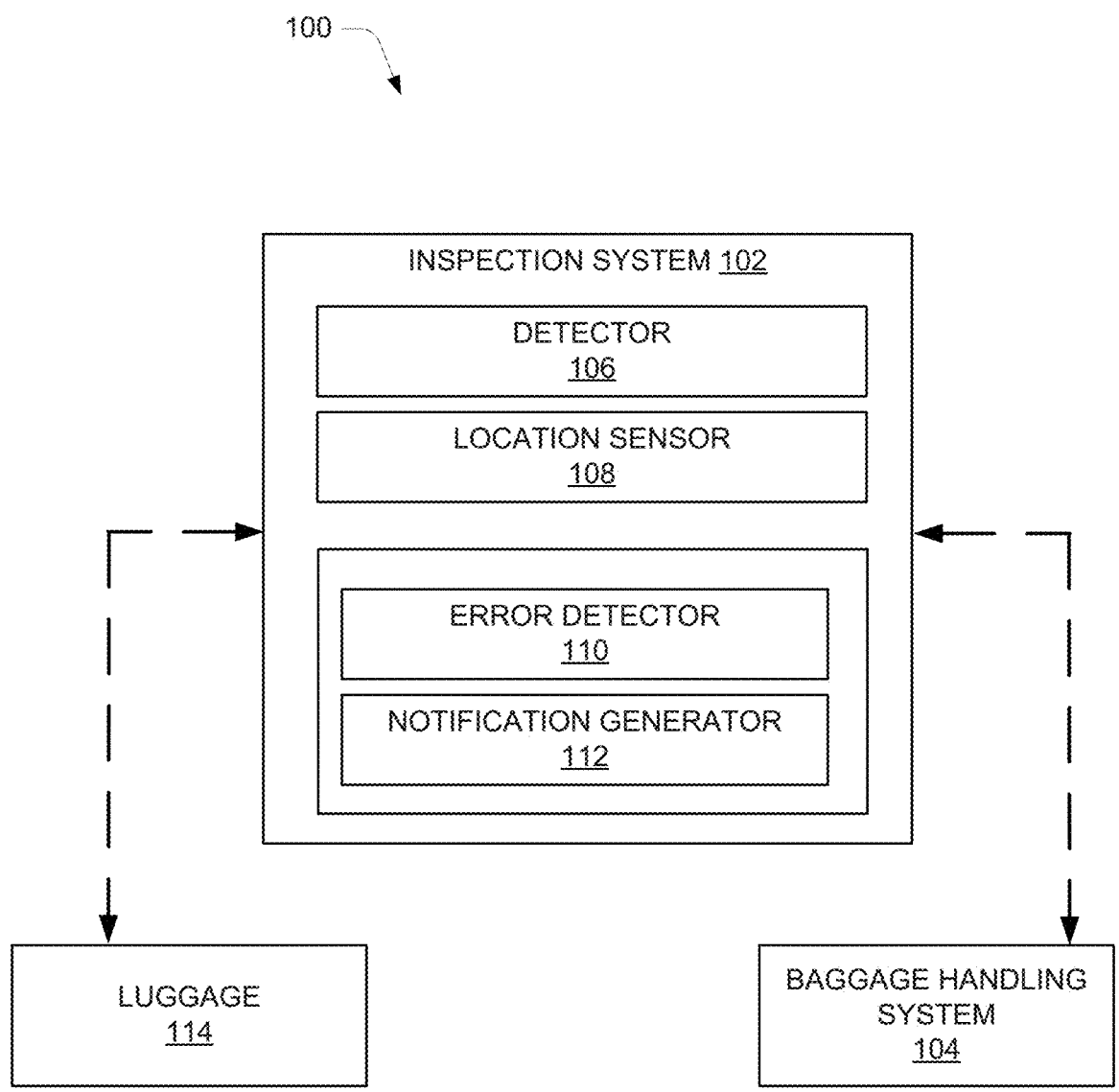
FIG. 1 illustrates an environment for implementation of an inspection system for non-invasive inspection of a baggage handling system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes aspects relating to techniques for non-invasive inspection of a mechanical system, such as a baggage handling system. The techniques involve the use of a detector including one or more sensors mounted on an item that moves along the mechanical system. For instance, in case of the baggage handling system, the detector can be mounted on a piece of baggage. In other examples, the detector may be associated with a dummy item, which may be kept in addition to the baggage or other items handled by the mechanical system. As the item moves along the mechanical system, the detector captures operational data, which indicates an instantaneous operational condition or current instantaneous condition of the mechanical system. This instantaneous operational condition can be used to determine an error present in the mechanical system.

In an example, as used in the description of the present disclosure, the item or baggage is an article that the mechanical system, such as the baggage handling system, acts on without the article itself providing propulsion along the mechanical system. In other words, the mechanical system that is being inspected using the detectors on the items propels the item along the mechanical system to inspect various sections of the mechanical system.

For example, the instantaneous operational condition so determined can be used to ascertain a general health of the mechanical system which can, in turn, be used for carrying out maintenance activities of the mechanical system. Because the detection is from the perspective of the item being handled by the mechanical system, the data is retrieved from close proximity to a component of the mechanical system that is the cause of the data (e.g., vibration, noise, odor, etc.), and not from outside the mechanical system. Therefore, the operational data regarding the current operational condition of the mechanical system, and in effect, the non-invasive inspection of the mechanical system so carried out in accordance with the present disclosure, may be more accurate than existing inspection systems and can eliminate the need for human inspectors, etc. Furthermore, a notification may be generated in response to the identification of the error, to perform a non-invasive inspection of the mechanical system.

The aspects described in the present disclosure involve retrieving first operational data from a detector mounted on an item being handled by the mechanical system. In an example, the mechanical system can be a baggage handling system and the item being handled can be a piece of baggage. Accordingly, in the present example, the detector can be mounted on the baggage. The detector includes one or more sensors, which constantly capture the first operational data regarding the mechanical system, the first operational data being indicative of the current operational condition of the mechanical system. In the present example, a first sensor in the detector can capture the first operational data, which may be provided for further analysis.

The sensors in the detector may include at least one of an image-processing device, such as, a video camera, an infrared camera, an odor sensor, a sound sensor, a temperature sensor, a speed sensor, a vibration sensor, and a Radio Frequency Identification (RFID) reader. Accordingly, in the present example, the first operational data may include at least one of the video footage recorded by the video camera, infrared patterns recorded by the infrared camera, odors detected by the odor sensor, sounds detected by the sound sensor, thermal patterns detected by the temperature sensor, the speed of a conveyor belt of the baggage handling system, the vibrations in the baggage handling system, and detection of the RFID tags by the RFID reader.

In addition, in an example, a location of the item in the mechanical system can be determined, to determine the location in the mechanical system where the deviation has occurred. For example, in case the mechanical system is a baggage handling system, one or more RFID tags may be disposed at various locations in the baggage handling system. Accordingly, the RFID tags may be read by the RFID reader to determine the location of the baggage including the detector, on the baggage handling system. As part of the further analysis, the first operational data is compared with a corresponding historical operational data. Accordingly, a deviation in the current operational condition of the mechanical system is determined based on the comparison. The historical operational data may be of generic value or may be specific to the mechanical system in question. For example, the infrared patterns may be compared with historical infrared patterns of several other mechanical systems that are performing a similar function. In another example, the infrared patterns can be compared with historical infrared patterns of the same mechanical system.

Further, based on the comparison, an error in operation of the mechanical system can be identified when the deviation in the first operational data from the historical first operational data, is determined. Therefore, when any deviation in the pattern of operation with respect to corresponding historical first operational data is determined, it may be indicative of an error. As an example, the error so identified can be one of an imminent error, for instance, indicating that the mechanical system is on the verge of a breakdown, or the error may be a likely error, which may indicate that the mechanical system may undergo breakdown if maintenance work is not carried out during a scheduled maintenance window, or may indicate an occurred error which indicates that the mechanical system has undergone a breakdown.

In an example, as part of identifying the error, an operational trend of the mechanical system, based on the historical first operational data can be determined. In this example, the operational trend can indicate a historical pattern in which the mechanical system has behaved. For instance, the operational trend may include a behavior of the mechanical system as recorded by one or more sensors in the detector that did not lead to an error. In another example, the operational trend may indicate the historical behavioral pattern of the mechanical system recorded by the sensors that lead to an error. Based on the deviation in operation of the mechanical system from the operational trend, which is in turn determined based on the comparison of the retrieved operational data from the sensor and the historical trend data, the error may be identified. The historical pattern or operational trend based on the historical first operational data is interchangeably referred to as the 'baseline'. Because the sensors in the detector can detect the variations in the operational data and parameters accurately and consistently, even the slightest change in the pattern or the trend can be observed. Further, as part of determining the error based on the operational trends, a general health of the mechanical system can be ascertained in order to perform preventive maintenance.

In addition, based on historical operational trends or the trend of the operational data currently recorded by the sensor, a threshold value for the first operational data for the sensor in the detector can be determined. The threshold value, as will be understood, is then used for determining the deviation of the instantaneous or current operational condition of the mechanical system from the pre-existing patterns or trends. Further, tying in with the indication of the type of error in the mechanical system discussed above, the threshold can be used to indicate whether a section of the baggage handling system needs to be serviced. In addition, various thresholds can be defined to indicate different events. For example, when the first operational data crosses one threshold, it may mean that there is likelihood of an imminent occurrence of error in the baggage handling system. At the same time, another threshold can be defined, which when exceeded by the first operational data, may indicate that a failure of the baggage handling system has already occurred.

The comparative analysis, as described above, may result in an accurate and comprehensive non-invasive inspection of the baggage handling system. For example, a breakdown may be detected by the inspection system well in time, and accordingly, a pre-emptive action can be taken to avoid any hindrance in the operation of the baggage handling system. In addition, because occurrence of errors can be detected by the inspection system and therefore, can be avoided as well, cost and inconvenience associated with maintenance of the baggage handling system are minimized. Furthermore, human intervention and consequent possibilities of human error in performing such inspection are additionally eliminated.

In addition, in another example, an error may be detected when a deviation is detected in at least a predefined number of parameters associated with the operation of the mechanical system. In other words, the error detected by one sensor in the detector may be corroborated with operational data from one or more other sensors in the detector to conclusively determine that an error is present in the mechanical system. Accordingly, second operational data can be retrieved from another sensor and compared with corresponding historical second operational data, to determine a deviation in the current operational condition of the mechanical system based on the second operational data from this other sensor. Similarly, third operational data from a third sensor may be retrieved to corroborate the occurrence of the error in the mechanical system.

Accordingly, the present disclosure includes a method of performing non-invasive inspection of the mechanical system, as explained above. In addition, the present disclosure additionally includes an inspection system adapted to carry out the non-invasive inspection of the mechanical system in the manner as described above. The techniques, i.e., the method and the inspection system of the present disclosure offer a comprehensive approach of non-invasive inspection of the mechanical system. The present disclosure describes integrating a plurality of sensors into one unit, i.e., the detector. Further, the techniques ensure an efficient and real-time monitoring and inspection of the mechanical system as the detector moves along the mechanical system. Therefore, as and when the error is detected, the error can be reported in real-time, by the generation of the notification, and an appropriate action to fix the error can be taken in a timely manner. Therefore, the present disclosure offers a comprehensive, flexible, scalable, accurate, effective, intelligent, and proactive approach for non-invasive inspection of mechanical systems, such as a baggage handling system.

FIG. 1 illustrates an environment 100 implementing an inspection system 102 for non-invasive inspection of a baggage handling system 104, such as the baggage handling system, according to an example embodiment of the present disclosure. Although the inspection system 102 is described henceforth with respect to the baggage handling system 104, as an example, the inspection system 102 can be implemented for the non-invasive inspection of any mechanical system in any other environment, for example, a mechanical system in a packaging industry.

The inspection system 102 may include a detector 106, a location sensor 108, and an error detector 110 in communication with the detector 106 and the location sensor 108, and a notification generator 112 in communication with the error detector 110. The detector 106 and the location sensor 108 may be provided as independent components or may be implemented as an integrated component.

The detector 106 may include one or more sensors (not shown) and may be mounted on an item that moves along the baggage handling system 104. For instance, in the present case of the baggage handling system 104, the detector 106 may be mounted on a piece of baggage 114 and the detector 106 and the location sensor 108 may be provided as separate components on the baggage 114. As the baggage 114 moves along the baggage handling system 104, the sensors in the detector 106 capture operational data that indicates an instantaneous operational condition of the baggage handling system 104. The detector 106 may detect values of a number of operational parameters associated with the operation of the baggage handling system 104. The operational parameters, interchangeably referred to as parameters, may include, but are not limited to, infrared characteristics, odors of the components of the baggage handling system 104, sounds created by the components, thermal patterns of the baggage handling system 104, a speed of a conveyor belt of the baggage handling system 104, a location of the baggage 114 in the baggage handling system 104.

In an example, the error detector 110 may retrieve operational data to detect an error. This operational data may include values of various parameters, which define a current operational condition of the baggage handling system 104. Based on the operational data, the current operational condition may be determined, which in turn may be used to determine an error in the baggage handling system 104.

If an error is detected, the error detector 110 may retrieve data from the location sensor 108 to determine a location of the baggage 114 in the baggage handling system 104, where the error occurred. In an example, the location sensor 108 may be implemented as an RFID reader capable of reading one or more RFID tags that may be disposed at various locations in the baggage handling system 104. The RFID tags may be read by the RFID reader (not shown) on the baggage 114 as part of the inspection system 102 to determine the section of the baggage handling system 104 in which the baggage 114 is located and, therefore, the section from which the operational data from sensors is being retrieved. For instance, when the RFID reader of the detector reads an RFID tag X that is installed on a conveyor belt section X of the baggage handling system 104, the baggage may be identified to be in the conveyor belt section X.

In another example embodiment, rather than using RFID tags as the location sensor 108, the inspection system 102 may employ other modes for determining the section of the baggage handling system 104 where the occurrence of error has been identified, based on section of the baggage handling system 104 in which the baggage 114 having the detector 106 is located. In one such example, a luggage report may be used to determine the section of the baggage handling system with the error. The baggage handling system 104 is controlled by a centralized system and the centralized system may generate the luggage report with information that indicates where a particular piece of baggage 114 is present in the baggage handling system 104.

In another example of determining the location of the baggage 114 without the location sensor 108, variance data analysis techniques may be used to determine the location of an error. For instance, as part of the variance data analysis, vibration parameter data may be analyzed. The variance of the vibration parameter data, which may be different for different sections of the baggage handling system 104, may assist the error detector 110 in identifying distinct sections or segments of the baggage handling system 104. The derived segments may be used to correlate to the reference location of the baggage 114 in the baggage handling system 104.

In yet another example embodiment, the location sensor 108, the luggage report, and the variance data analysis technique can be used in any combination to obtain an accurate position of the baggage 114 in the baggage handling system 104, to identify the section of the baggage handling system 104 that is being inspected for errors.

Further, to notify a user, such as, for example, an operator, regarding the error, the notification generator 112 may provide a notification indicating the occurrence of an error. For instance, the notification generator 112 may generate a fault notification to perform a non-invasive inspection of the baggage handling system 104. Further, the error detector 110 may provide periodic updates regarding a general health of the baggage handling system 104, based on the current operational condition of the baggage handling system 104, which can, in turn, be used for carrying out maintenance activities.

Figure 2:
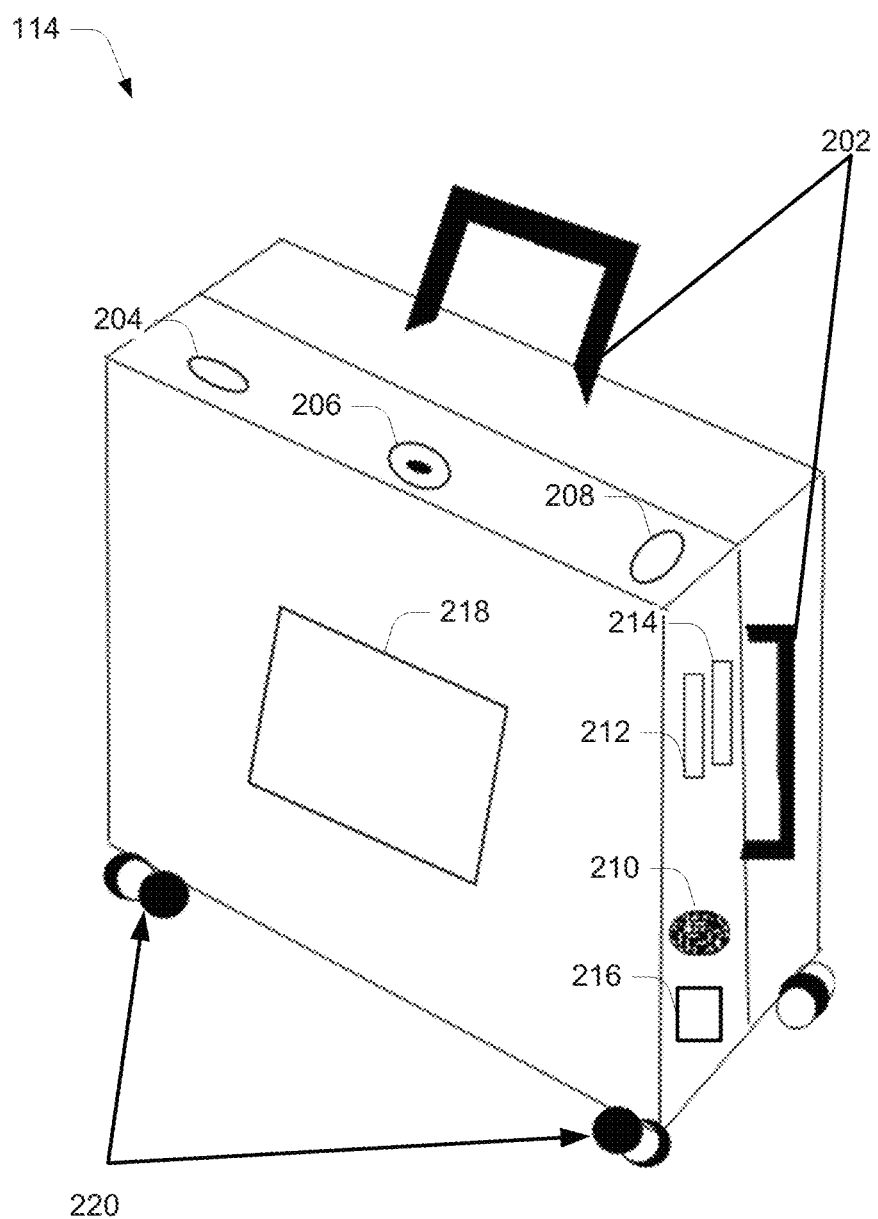
FIG. 2 illustrates a perspective view of a baggage, according to an example embodiment of the present disclosure.

FIG. 2 illustrates a perspective view of the baggage 114 including the detector 106, according to an example embodiment of the present disclosure. In the present example, the term detector 106 is used to refer, either individually or collectively, to the various sensors on board the baggage 114, as is explained later. The baggage 114 may include, but is not limited to, a handle 202, a microphone 204, a camera 206, an air inlet/outlet 210, a display connector 212, an accessory connector (e.g., a USB connector) 214, a battery charging connector 216, a window portion 218, and a plurality of wheels 220 for mobility of the baggage 114. For example, the window portion 218 can include a transparent material that allows viewing components inside baggage 114.

The handle 202 may be used for handling or lifting the baggage 114. The camera 206 may be a component of the detector 106 for recording video footage of the baggage handling system 104 and the immediate vicinity. The USB connector 214 may be disposed for service and diagnostic purposes of the baggage 114. The battery charging connector 216 may be understood as a port for charging a battery (not shown) of the baggage 114. As an example, the operational direction of the baggage 114 is indicated by the arrow labelled 208 and the operational orientation of the baggage 114 is indicated by the arrow labelled 209.

Figure 3:
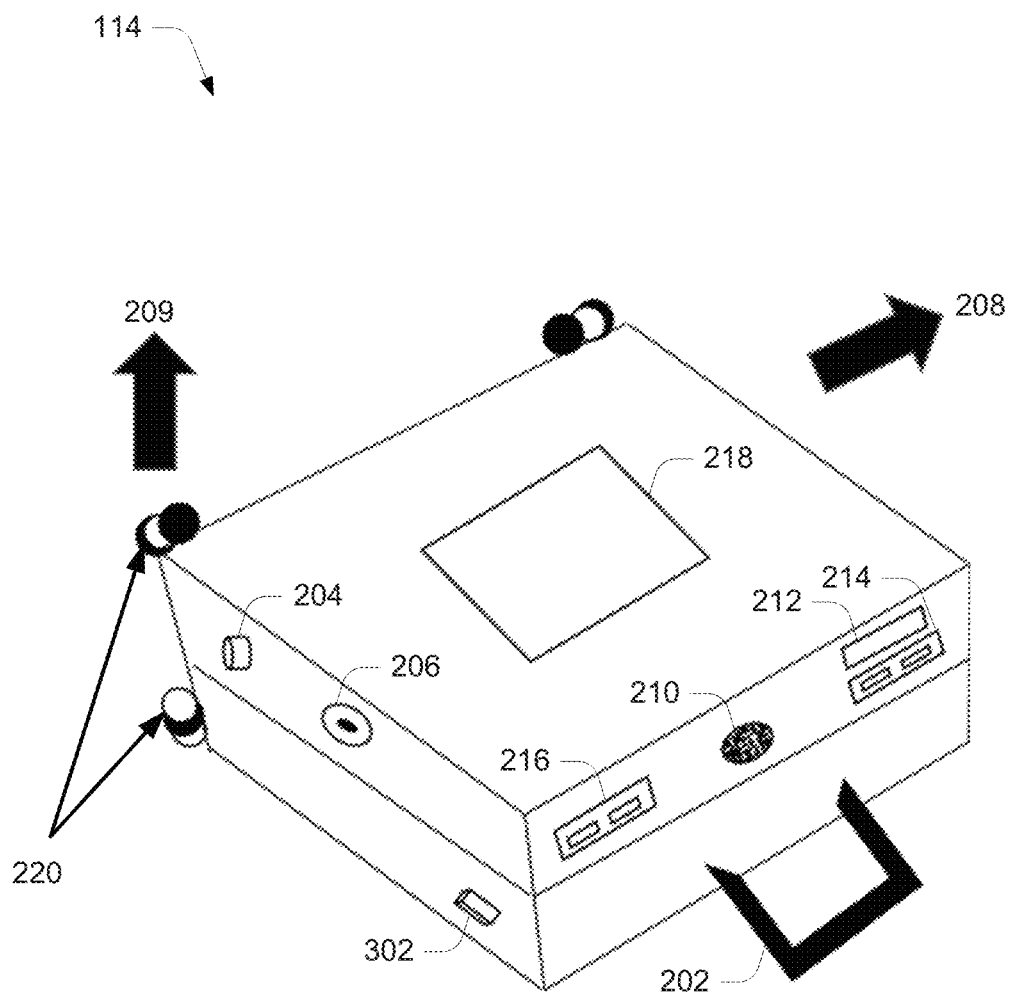
FIG. 3 illustrates another perspective view of the baggage, according to an example embodiment of the present disclosure.

FIG. 3 illustrates another perspective view of the baggage 114, according to an example embodiment of the present disclosure. In this perspective view, the baggage 114 is shown to include an accelerometer 302 as well. In an example embodiment, the accelerometer 302 may be understood as a component of the detector 106 for detecting the speed, vibration, and/or acceleration of the baggage 114 or the conveyor belt of the baggage handling system 104. In the present example, the operational direction 208 of the baggage 114 can be understood as the direction in which the baggage 114 is to be moved for the detectors 106 to operate for inspecting the baggage handling system 104. Further, in the present example, the operational orientation 209 of the baggage 114 can be understood as the direction in which the baggage 114 is placed, for instance, on the conveyor of the baggage handing system 104.

Figure 4:
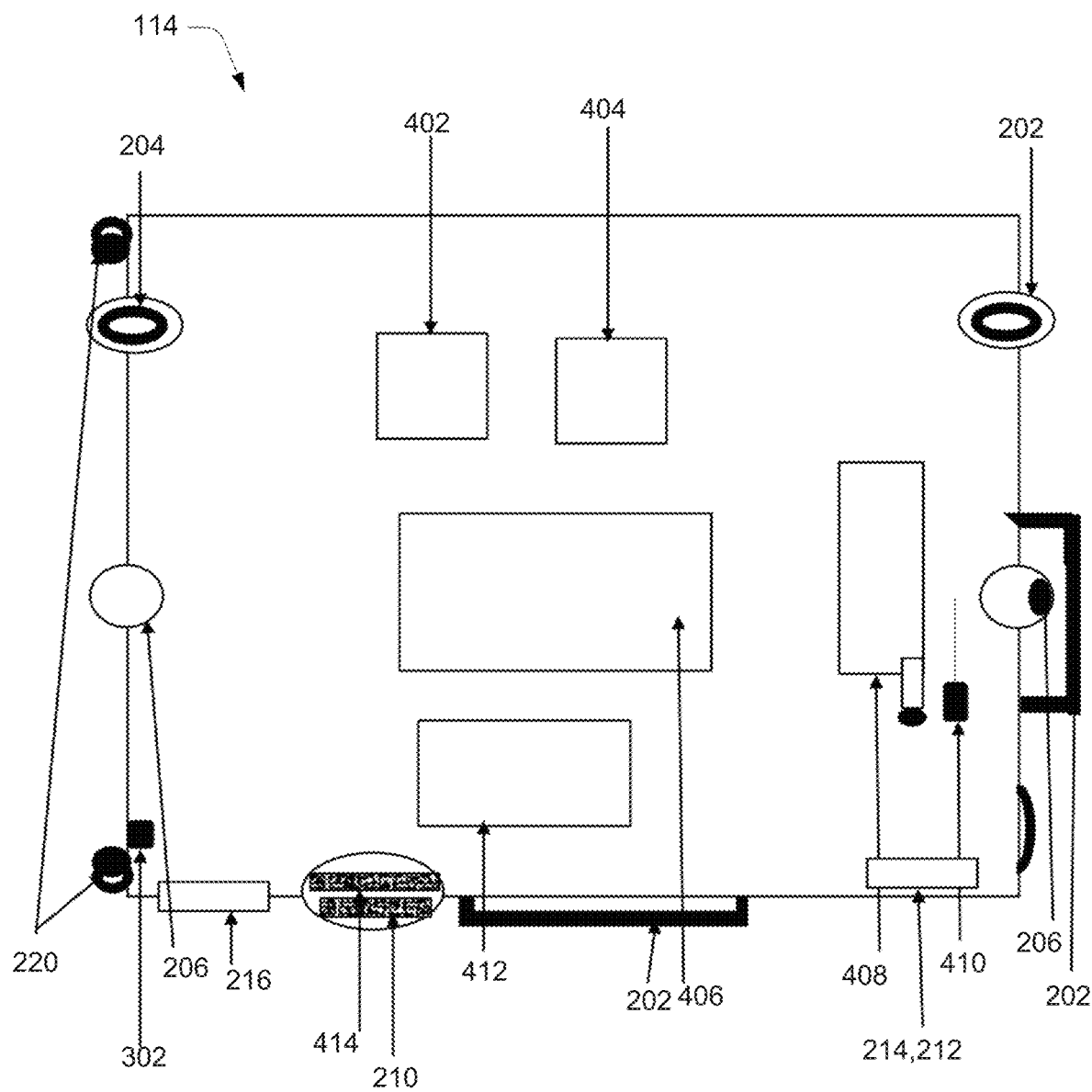
FIG. 4 illustrates a top view of the baggage, according to an example embodiment of the present disclosure.
Figure 5:
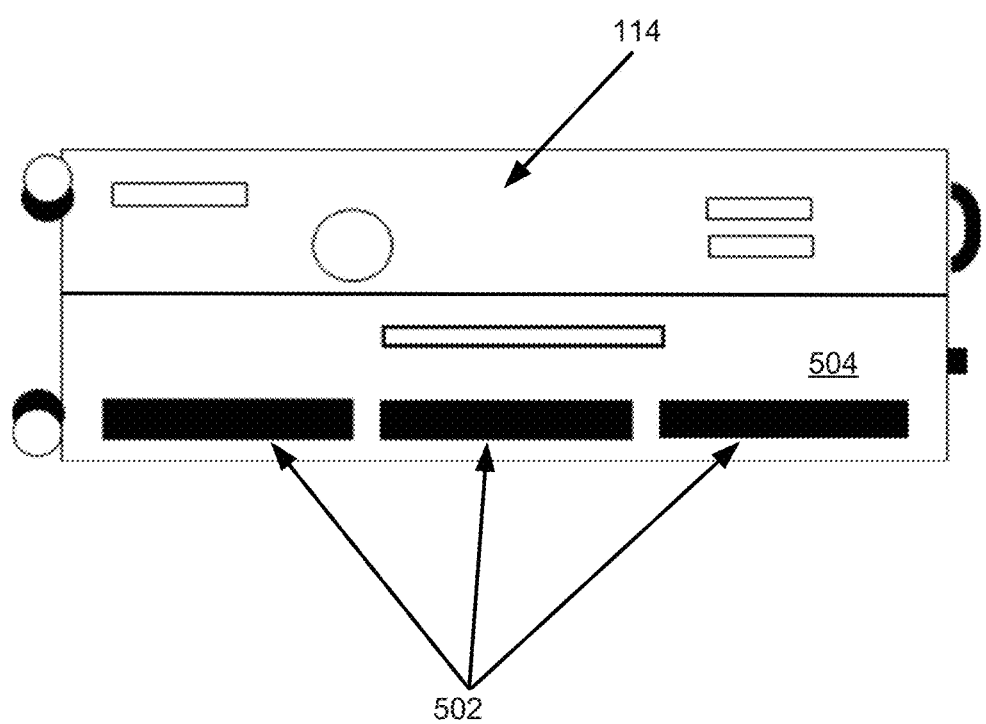
FIG. 5 illustrates a side view of the baggage, according to an example embodiment of the present disclosure.

FIG. 4 illustrates a top view of the baggage 114, according to an example embodiment of the present disclosure. In the top view, the baggage 114 is shown to include USB hub 402, USB hub 404, a Tablet PC 406, a temperature sensor 408, an odor sensor 410, a power bank 412, and a fan 414. FIG. 5 illustrates a side view of the baggage 114, according to an example embodiment of the present disclosure. In the side view, the baggage 114 is shown to include wooden planks 502 disposed at an inside bottom end 504. In an alternative example embodiment, the baggage 114 may include planks 502 made of some other material, without departing from the scope of the present disclosure. The planks 502 may be disposed for weight adjustment of the baggage 114 such that the baggage 114 is not thrown off the baggage handling system 104 due to its light weight, while simultaneously ensuring a smooth travel of the baggage 114 on the baggage handling system 104. In the example of the present disclosure shown in FIGS. 2 to 5, the dimensions of the baggage 114 may be 800×800×400 (measured in millimeter) and the weight of the baggage can be around 12 kilograms. With such dimensions and weight, the baggage 114 may remain stationary on the baggage handling system 104 and, therefore, allow for an effective operation of the detector 106 in capturing the operational data. When the baggage 114 is smaller than a certain size (e.g., a threshold size or volume) and/or has a weight below a weight threshold, the baggage 114 may not remain stationary (e.g., may move around or rotate) while being moved along the baggage handling system 104. On the other hand, if the baggage 114 is too large, it may be unable to pass through narrow passages in the baggage handling system 104.

Referring back to FIG. 1, as mentioned previously, the RFID tags can be disposed at various locations in the baggage handling system 104. In addition, the location sensor 108 may include a RFID reader and may be mounted in the baggage 114. Thus, while passing through one of the locations with the RFID tag, the location sensor 108 may detect the RFID tag and therefore, the current location of the baggage 114.

The operational data as detected by various sensors of the detector 106 may be forwarded to or retrieved by the error detector 110. The operational data may include, for example, video footage of the baggage handling system 104 and the immediate vicinity, infrared patterns, odors of the baggage handling system 104, sounds of the baggage handling system 104, thermal patterns of the baggage handling system 104, a speed of a conveyor belt of the baggage handling system 104, vibrations in the baggage handling system 104, and detection of the RFID tag.

The error detector 110 may compare the detected first operational data with historical first operational data pertaining to the first sensor retrieved over a period of time. The error detector 110 may determine an error in operation of the baggage handling system 104 based on the comparison, wherein the error is indicative of a deviation of the current operational data from the historical first operational data.

Figure 6:
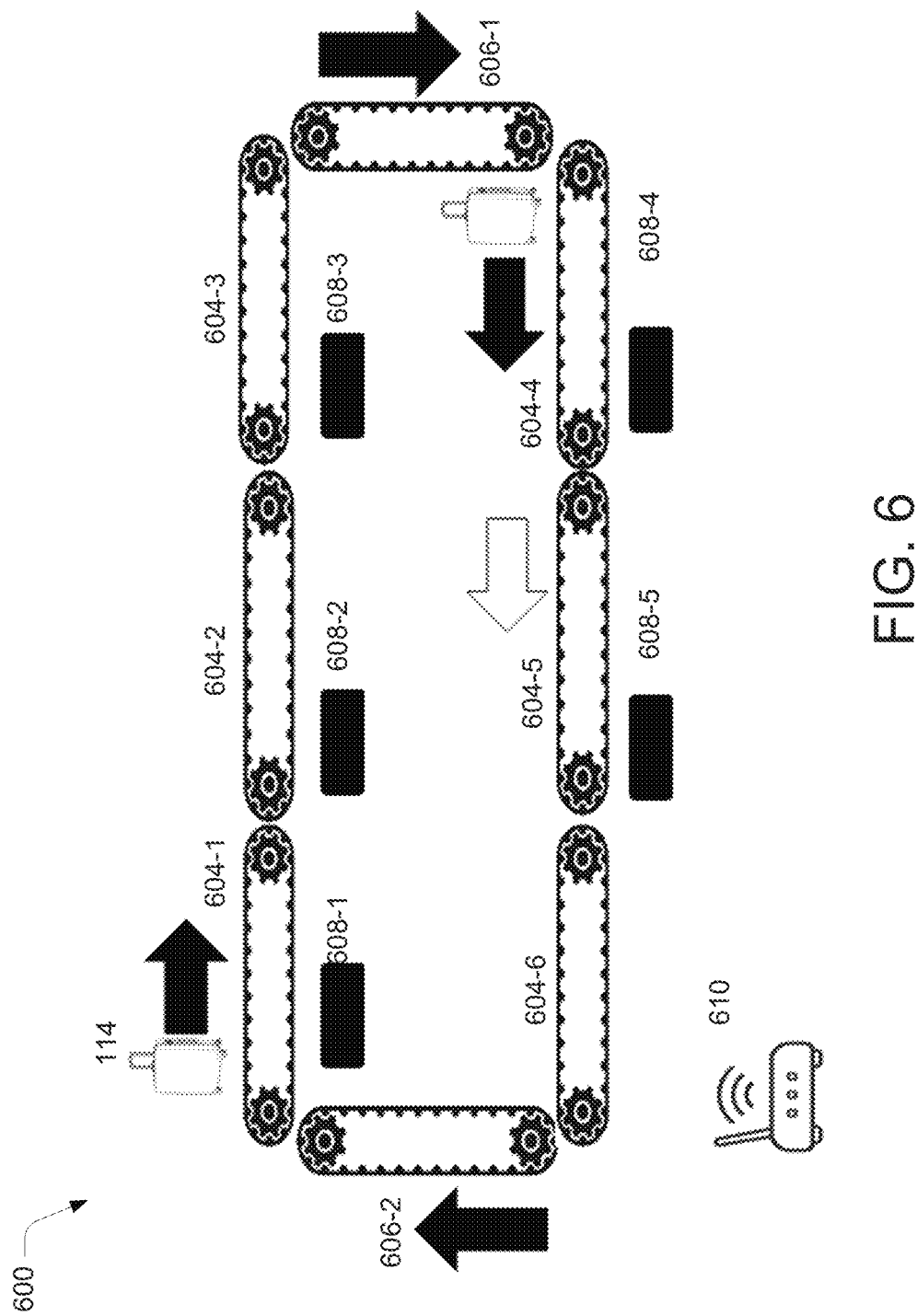
FIG. 6 illustrates an environment for implementation of the inspection system for the non-invasive inspection of a plurality of conveyor belts, according to an example embodiment of the present disclosure.

FIG. 6 illustrates an environment 600 for implementation of the inspection system 102 for the non-invasive inspection of a baggage handling system 104 including a plurality of conveyor belts 604, according to an example embodiment of the present disclosure. For the sake of brevity, constructional and operational details of the inspection system 102 and the baggage 114 that are already explained in the description of FIG. 1, FIG. 2, FIG. 3, FIG. 4, and FIG. 5 are not explained in detail in the description of FIG. 6.

The baggage handling system 104 may include the plurality of conveyor belts 604, individually referred to as, a conveyor belt 604-1, a conveyor belt 604-2, a conveyor belt 604-3, . . . and a conveyor belt 604-N. In the illustrated embodiment, the plurality of conveyor belts 604 includes the conveyor belt 604-1, the conveyor belt 604-2, the conveyor belt 604-3, and the conveyor belt 604-6. The baggage handling system 104 may additionally include a plurality of sorters 606, interchangeably referred to as routers 606, operating in conjunction with the plurality of conveyor belts 604 to move the baggage 114. In the illustrated embodiment, the baggage handling system 104 includes a router 606-1 and a router 606-2.

The conveyor belt 604-1, the conveyor belt 604-2, and the conveyor belt 604-3 may form a first section of the conveyor belts 604 of the baggage handling system 104. Similarly, the conveyor belt 604-4, the conveyor belt 604-5, and the conveyor belt 604-6 may form a second section of the conveyor belts 604 of the baggage handling system 104. The router 606-1 may route the baggage 114 from the first section of the conveyor belts 604, in particular, from the conveyor belt 604-3, to the second section of the conveyor belts 604, in particular, to the conveyor belt 604-4. Similarly, the router 606-2 may route the baggage 114 from the second section of the conveyor belts 604, in particular, from the conveyor belt 604-6, to the first section of the conveyor belts 604, in particular, to the conveyor belt 604-1.

As illustrated by arrows, the baggage 114 may be introduced in the baggage handling system 104 at the conveyor belt 604-1. The baggage 114 may move towards the conveyor belt 604-2 and subsequently, the conveyor belt 604-3 before being routed to the conveyor belt 604-4 through the router 606-1. Furthermore, the baggage 114 may move towards the conveyor belt 604-5 and subsequently, to the conveyor belt 604-6, before being routed to the conveyor belt 604-1 through the router 606-2.

As explained earlier, the detector 106 of the inspection system 102 may be installed on the baggage 114. Furthermore, multiple RFID tags 608 of the inspection system 102 may be disposed on the plurality of conveyor belts 604. In the illustrated embodiment, one RFID tag 608 is disposed at each of the plurality of conveyor belts 604. The RFID tags 608 may individually be referred to as an RFID tag 608-1, an RFID tag 608-2, . . . and an RFID tag 608-6.

Inspection system 102 may determine the location of the baggage 114 on the baggage handling system 104 based on the detection of the RFID tags 608 by the RFID reader of the detector 106. For example, when the inspection system 102 determines that the detector 106 reads the RFID tag-3, the inspection system 102 may determine that the baggage 114 is on the conveyor belt 604-3. Further, the routers 606 may determine a route of the baggage 114 on the baggage handling system 104, based on the detection of the RFID tags 608 by the detector 106.

For example, the baggage 114 may be loaded on the baggage handling system 104 at a departure hall moving towards an airport terminal, e.g., Terminal A. At Terminal A, the baggage handling system 104 may include an additional router 606 that detects the baggage 114 and routes the baggage back to an incoming portion of the baggage handling system 104 that may move the baggage 114 towards an arrival hall. At the arrival hall, the baggage handling system 104 may include an additional router 606 that identifies the baggage 114 and automatically routes the baggage 114 to an outgoing portion of the baggage handling system 104.

Further, the inspection system 102 may include an intelligent baggage docking station 610 disposed near the conveyor belt 604-6. The intelligent baggage docking station 610 may wirelessly communicate, for example, via Wi-Fi or 3G/4G LTE connectivity, or other such technologies, with the baggage 114 when the baggage 114 is within a detectable range of the intelligent baggage docking station 610. The operational details pertaining to the baggage handling system 104 as detected by the detector 106 and determined by the error detector 110 may be uploaded to the intelligent baggage docking station 610. Specifically, operational data pertaining to the baggage handling system 104, the location of the baggage 114 on the baggage handling system 104, and determination of the error in the operation of the baggage handling system 104 may be uploaded in the intelligent baggage docking station 610.

Although the inspection system 102 is shown to include one docking station 610 in the present example embodiment, the inspection system 102 may include a plurality of intelligent baggage docking stations 610 disposed around the baggage handling system 104, without departing from the scope of the present disclosure. The intelligent baggage docking stations 610 may be disposed such that the baggage 114 may maintain a continuous wireless communication with the intelligent baggage docking stations 610 in order to enable real-time monitoring of the baggage 114 on the baggage handling system 104.

Figure 7A:
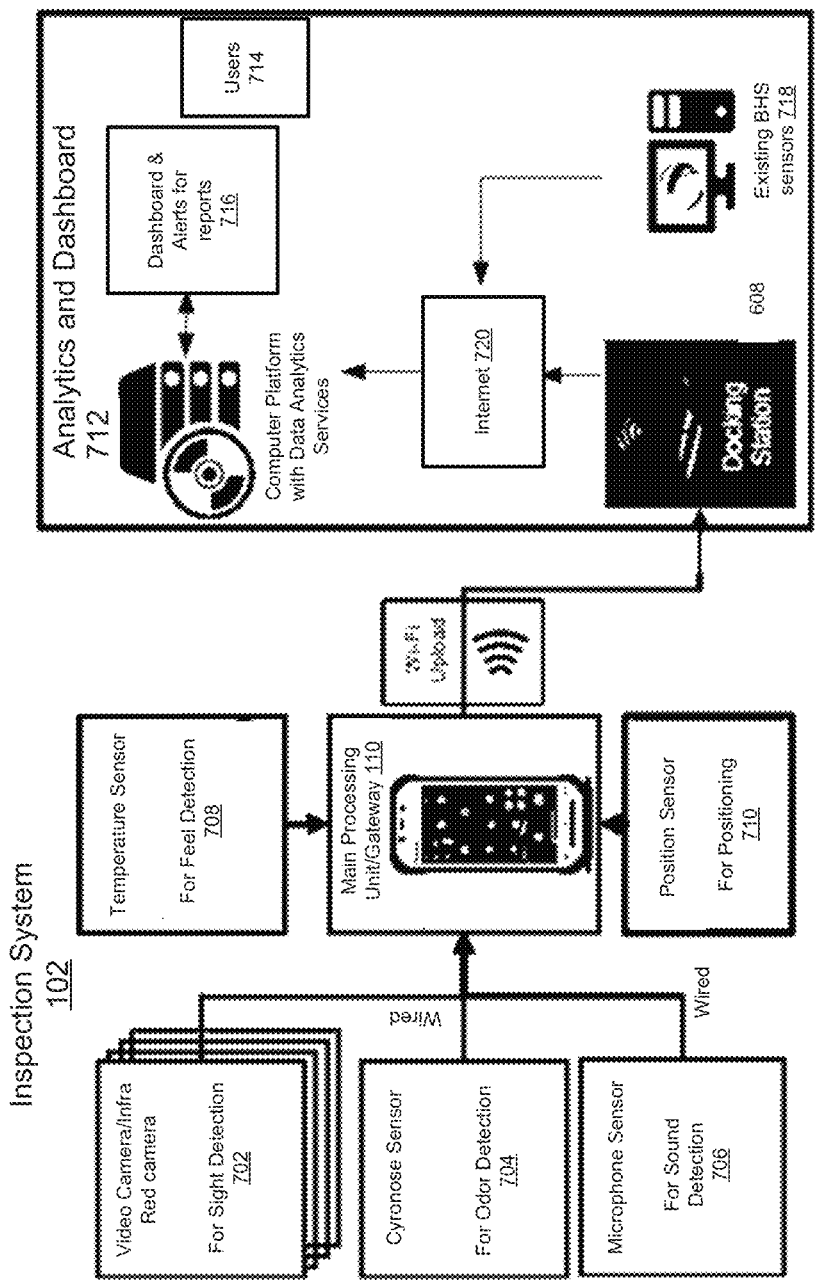
FIG. 7*a* illustrates a block diagram of the inspection system, according to an example embodiment of the present disclosure.

FIG. 7a illustrates a block diagram of the inspection system 102, according to an example embodiment of the present disclosure. For the sake of brevity, constructional and operational details of the inspection system 102 that are already explained in the description of FIG. 1, FIG. 2, FIG. 3, FIG. 4, FIG. 5, and FIG. 6 are not explained in detail in the description of FIG. 7a.

In operation, the error detector 110 of the inspection system 102 may retrieve first operational data from the detector 106 mounted on the baggage 114 being handled by the baggage handling system 104. The detector 106 includes one or more sensors, which may constantly capture operational data associated with baggage handling system 104.

The sensors in the detector 106 may include at least one of a video camera, an infrared camera 702, an odor sensor 704, a sound sensor 706, a temperature sensor 708, a speed sensor (not shown), a vibration sensor (not shown), and an RFID reader 710. The detector 106 may detect the operational data pertaining to the operation of the baggage handling system 104. It may be noted that a single sensor can be used to determine multiple parameters. For example, the sound sensor 706 may be able to determine or receive parameters lying in the low frequency band, in the 1 kHz-5 kHz frequency band, in the 5 kHz-10 kHz frequency band, in the 10 kHz-15 khz frequency band and so on so forth. In another example, the accelerometer or the vibration sensor may be able to derive X-Y-Y axis parameters, X-Y-X tilt or gyro parameters, and X-Y-Z magnetometer (magnetic field) parameters. In another example, the odor sensor may be used to determine a plurality of different types of smell related parameters, e.g., in an embodiment, the odor sensor may detect 32 types of odors.

In an example, the error detector 110 may obtain the first operational data indicative of the current operational condition of the baggage handling system 104 from a first sensor in the detector 106. The first operational data may include, but is not limited to, video footage recorded by the video camera, infrared patterns recorded by the infrared camera (as indicated by block 702), odors detected by the odor sensor, such as cyranose® sensor (as indicated by block 704), sounds detected by the sound sensor, such as a microphone sensor (as indicated by block 706), thermal patterns detected by the temperature sensors (as indicated by block 708), the speed of the conveyor belt 604 of the baggage handling system 104, vibrations in the baggage handling system 104, and detection of the RFID tags 608 by the RFID reader (as indicated by block 710).

Upon obtaining the first operational data, the error detector 110 may compare the first operational data with corresponding historical first operational data. Based on the comparison, the error detector 110 may determine a deviation in the current operational condition of the baggage handling system 104. The historical first operational data may be a generic value or may be specific to the baggage handling system 104 in question.

Figure 7B:
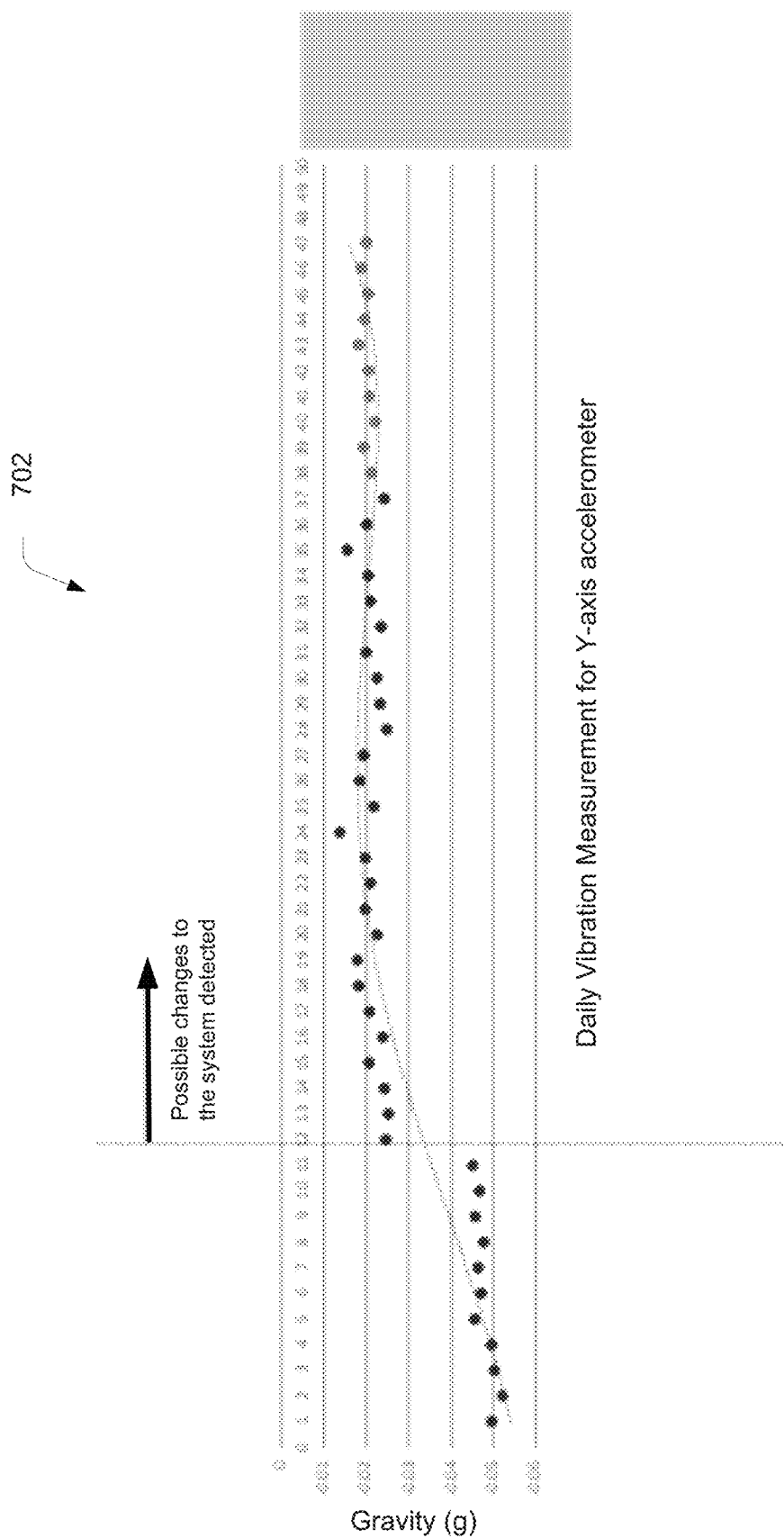
FIG. 7*b* illustrates a sample plot showing baseline data specific to the baggage handling system, according to an example embodiment of the present disclosure.

For instance, FIG. 7b illustrates a sample plot 702 for an accelerometer for which data readings have been captured on daily basis for the baggage handling system 104, showing the historical first operational data or the baseline data that is specific to the baggage handling system 104. In the present example, the sample plot 702 can illustrate the accelerometer-captured data for axis Y for specific location of the baggage handling system 104. As can be seen, data is plotted each day and as the data shows consistent reading, it can be used as the baseline, i.e., as the historical first operational data, to compare the data from the accelerometer in real time. As can also be seen from the sample plot 802, the readings at a few points jump to a different level which indicates a potential error in the baggage handling system 104.

Furthermore, based on the comparison, the error detector 110 may identify an error in operation of the baggage handling system 104, when a deviation in the first operational data of the baggage handling system 104 with respect to the historical first operational data is detected. Therefore, when the error detector 110 determines any deviation in the pattern of operation with respect to corresponding historical first operational data, it is indicative of an error. As an example, the error so identified can be one of an imminent error, for instance, indicating that the mechanical system is on the verge of a breakdown, or the error may be a likely error or potential error, which may indicate that the mechanical system may undergo breakdown if maintenance work is not carried out in due course, or may indicate an occurred error which indicates that the mechanical system has broken down.

For example, in case of overloaded motors, burned motors, or worn out conveyor belts 604, the odor sensor 704 may detect odor emanating from the burn of these components. Further, the temperature sensor 708 may detect an isolated hot zone in the baggage handling system 104 or the sound sensor 706 may detect out of the ordinary sounds, such as a sound of screeching, knocking, and rattling or the vibration sensor may detect vibrations. Similarly, in case of a worn out bearing or a worn out shaft of the baggage handling system 104, the odor sensor 704 may detect the odor of burning or the sound sensor 706 may detect the sound of screeching, knocking, and rattling or the vibration sensor may detect vibrations. An odor profile developed based on the detection of the odor sensor 704 may be analyzed to determine an error in the operation of the baggage handling system 104.

Additionally, the temperature sensor 708 may detect ambient temperature of the baggage handling system 104 over a period of time. In an example embodiment, a slow and long-lived (e.g., continuous) temperature change may be indicative of normal operation of the baggage handling system 104, for example, where there may be sections of the baggage handling system 104 that are warmer than other sections. On the other hand, sudden and short-lived temperature rise may be indicative of the presence of a nearby heat source. Consequently, a notification may be generated.

Further, in certain cases, the infrared camera 702 may detect errors, such as unusual packages on the baggage handling system 104, damaged railings of the baggage handling system 104, or any wear of the conveyor belts 604. In an example embodiment, the sound detected by the sound sensor 706 may be used for acoustic signal analysis. Such an analysis may help inspection system 102 predict the occurrence of a fault. For example, an anomaly in the sound of a motor may be an early indication of a fault in the motor.

In an example embodiment, for acoustic signal analysis, the error detector 110 may receive data from the sound sensor 706 of the detector 106. In addition, the error detector 110 may filter background noise data from the received data by comparing with historical first operational data. For example, the background noise data can be removed by comparing operational data with previously stored data coming from a healthy system and which data has been validated.

The error detector 110 may characterize the detected data by determining whether signal strength of detection is increasing, decreasing, or constant. For example, a constant signal strength is indicative of regular operation, whereas a strength that increases and decreases continuously may indicate a trend towards failure of the baggage handling system 104. Further, in case the data is a short term signal, the error detector 110 may determine the error as one-off incident.

In an example embodiment, the RFID reader 710 may allow variable power setting for RF power transmission. The variable power settings may allow fine tuning when the RFID tags 608 are within a detection range of the RFID reader 710. Fine tuning may be required during implementation to ensure that only the RFID tag 608 that is on a section where the baggage 114 is currently present is detected.

In an example, as part of identifying the error, the error detector 110 can determine an operational trend of the baggage handling system 104, based on the historical first operational data. In this example, the operational trend can indicate a historical pattern in which the baggage handling system 104 has behaved. For instance, the operational trend may include a behavior of the baggage handling system 104 as recorded by one or more sensors in the detector 106 which behavior did not lead to an error. Based on the deviation of the current operational data of the baggage handling system 104 from the operational trend, which the error detector 110 in turn determines based on the comparison of the retrieved first operational data from the first sensor and the historical operational data, the error detector 110 identifies the error. In another example, the operational trend may include the historical behavioral pattern recorded by the sensors that the error is preceded by, i.e., the historical behavioral pattern that lead to an error in the past.

In addition, based on current operational trends and historical operational trends recorded by the sensors, the error detector 110 can determine a threshold value for the operational data for each sensor in the detector 106. The error detector 110 can use this threshold for determining the deviation of the current operational condition of the baggage handling system 104 from historical patterns or trends. The threshold may indicate whether a section of the baggage handling system 104 needs to be serviced or not. The threshold value may be defined such that crossing the threshold value may indicate a trend towards failure thereby indicating that a failure is imminent. A notification may then be generated to warn a user that the baggage handling system 104 is need of service in the near term. Alternatively, the threshold may be defined such that crossing the threshold value indicates that a failure has occurred. In this case a notification may be generated to indicate that, the baggage handling system 104 is in need of immediate service. In an example embodiment, the notification generator 112, in communication with the error detector 110, may generate a corresponding a notification.

In an example, the error detector 110 may validate occurrence of an error in the operation of the baggage handling system 104. Specifically, the error detector 110 may corroborate the error detected by one sensor in the detector 106 with operational data from other sensors in the detector 106 to conclusively determine that an error is present in the baggage handling system 104. Accordingly, the error detector 110 can retrieve second operational data from another sensor and compare the second operational data with corresponding historical second operational data, to determine a deviation in the current operational condition of the baggage handling system 104 based on the second operational data. Similarly, the error detector 110 can retrieve third operational data from a third sensor to corroborate the occurrence of the error in the baggage handling system 104. Therefore, the error detector 110 may be configured to use any number of sensors and retrieve the operational data therefrom to corroborate and validate the findings.

As mentioned previously, the historical first operational data used for determining the deviation may include the trends or patters in the recordings from the sensors, indicating the historical operational trend of the baggage handling system 104. In other words, instead of observing a significant difference directly in the operational data from the sensors, the error detector 110 may instead use the operational trend of the baggage handling system 104 to record even a small deviation in operational condition from the historical operational trend. In addition, as mentioned previously, for each sensor the thresholds for the trends can be set separately to provide different levels of sensitivity of the inspection system 102.

As an example of the above, the error detector 110 may correlate readings from the vibration sensor, the odor sensor 704, the sound sensor 706, and the RFID reader 710 to validate the detection of an error. For example, at a specific time point, the sound sensor 706 may detect a loud noise, the vibration sensor may detect unusual vibrations, and the odor sensor 704 may detect a burn odor. Based on the abnormalities detected by multiple sensors of the detector 106 at the same time, the error detector 110 may conclude that a likelihood of an error in the baggage handling system 104 is high.

Further, upon such corroboration of the occurrence of the error from multiple sensors, the notification generator 112 may generate the fault notification to indicate the error. In an example embodiment, the criticality associated with the notification generated in subsequence of corroboration by multiple sensors may be greater than the criticality associated with a notification generated by, for example, a single sensor.

In an example embodiment, the inspection system 102 may store inputs provided by human operators in response to notifications generated. Then, based on these stored inputs, the inspection system 102 may define the criticality of similar errors determined later. For example, if a notification generated by the inspection system 102 is deemed to be a false positive by a human operator and indicated as such, a similar notification generated at a later time may be automatically classified by the inspection system 102 as a false positive.

Figure 8A:
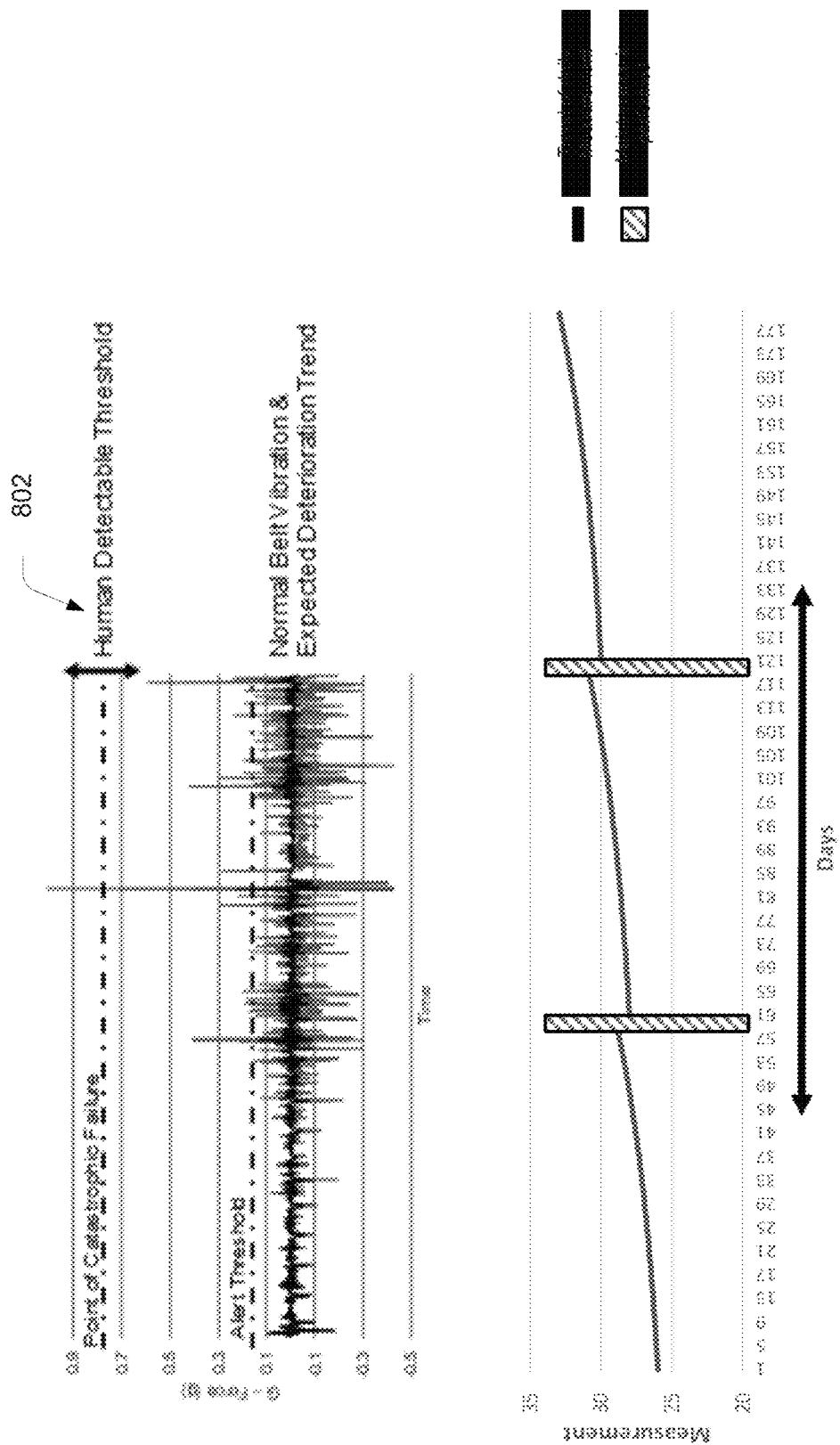
FIG. 8*a* illustrates a graph indicating patterns of vibrations detected by a detector of the inspection system over a period of time, according to an example embodiment of the present disclosure.
Figure 8B:
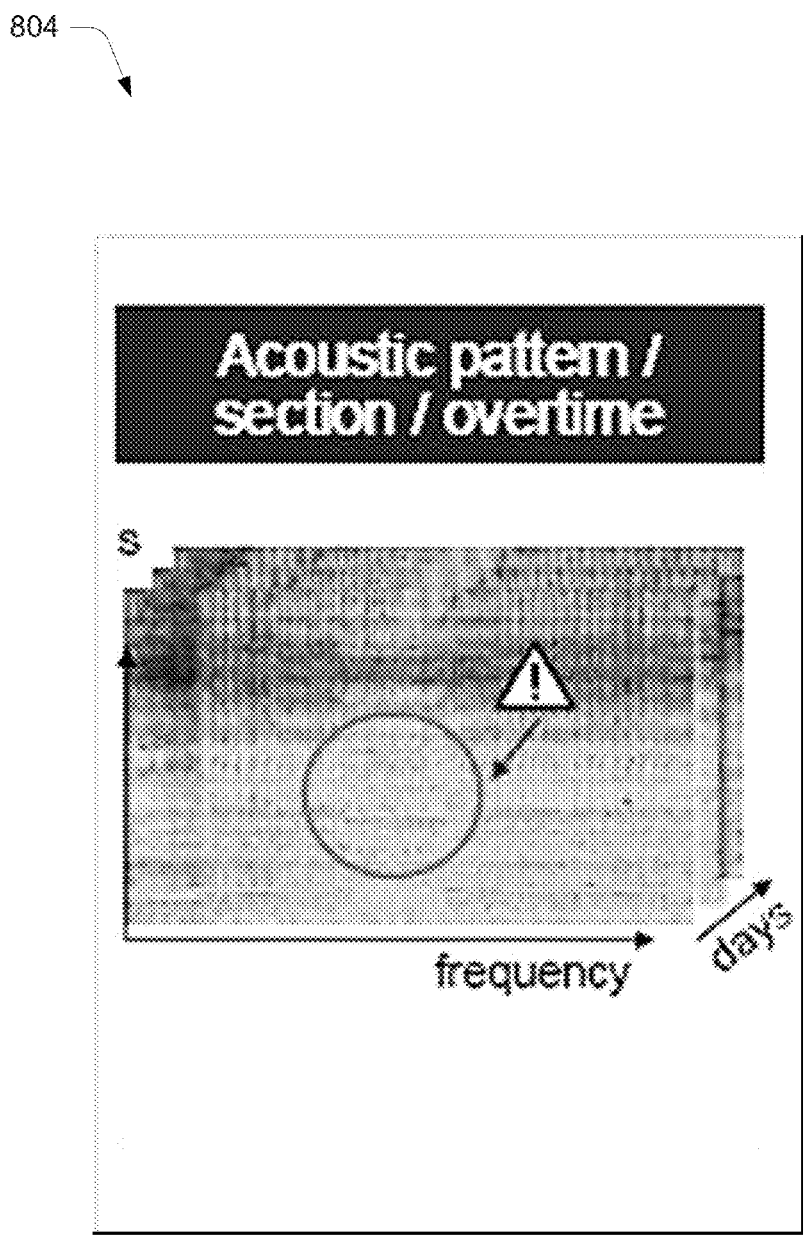
FIG. 8*b* illustrates a graph indicating a pattern of acoustic signals detected by the detector over a period of time, according to an example embodiment of the present disclosure.

FIGS. 8a and 8b illustrate patterns of the vibrations, acoustic signals, and the speed as detected by the inspection system 102 over a period of time, according to an example embodiment of the present disclosure. FIG. 8(a) illustrates an example graph 802 indicating patterns of the vibrations detected by the vibration sensor of the detector 106 over a period of time.

Figure 8C:
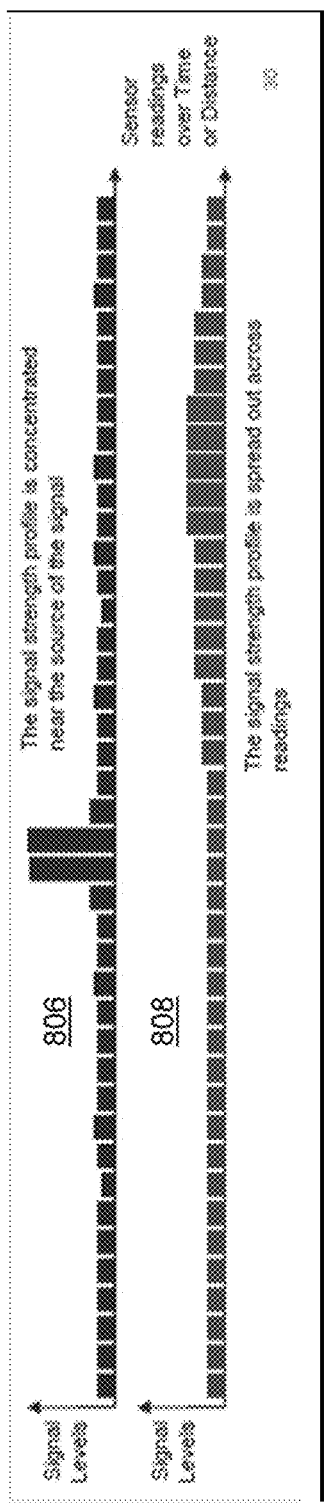
FIG. 8*c* illustrates a first profile and a second profile for sounds detected by the detector, according to an example embodiment of the present disclosure.

FIG. 8b illustrates an example graph 804 indicating a pattern of the acoustic signals detected by the sound sensor 706 over a period of time, according to an example embodiment of the present disclosure. As the detector 106 moves along the baggage handling system 104, signal strength from the detector 106 may increase or decrease based on a location of an error in the baggage handling system 104. The signal strength may increase as the detector 106 gets closer to the location of the error. On the other hand, the signal strength may decrease as the detector 106 gets away from the error. This change in signal strengths based on the movement of the baggage 114 along the baggage handling system 104 may assist in distinguishing an acoustic signal reading from the error present in the baggage handling system 104, from surrounding noise. FIG. 8c illustrates a first profile 806 and a second profile 808 for sounds detected by the detector 106, according to an example embodiment of the present disclosure.

Figure 8D:
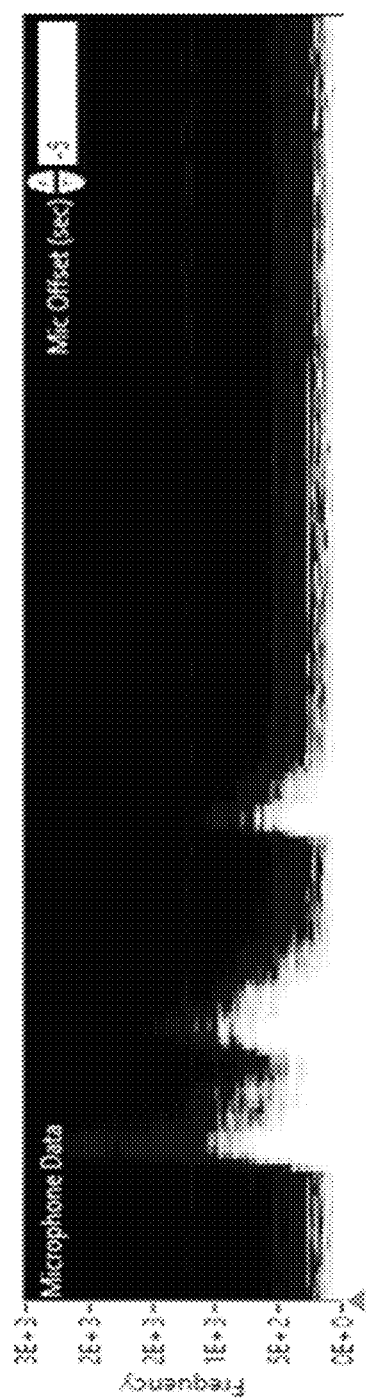
FIG. 8*d* illustrates a profile of sound signal readings in case of a conveyor belt rubbing slipping a belt shaft, according to an example embodiment of the present disclosure.

FIG. 8d illustrates a profile of sound signal readings that may be present when a conveyor belt is rubbing or slipping on a shaft, according to an example embodiment of the present disclosure. Generally, different parts of the baggage handling system 104 may emit different sound signals. For example, the conveyor belt 604 rubbing or slipping on a belt shaft emits a sound that may correspond to signal readings in medium frequency ranges, as illustrated in FIG. 8(d). Furthermore, a belt slipping from the belt shaft may emit a sound that is intermittent and, therefore, may cause the sound reading over time to be spotty.

Figure 8E:
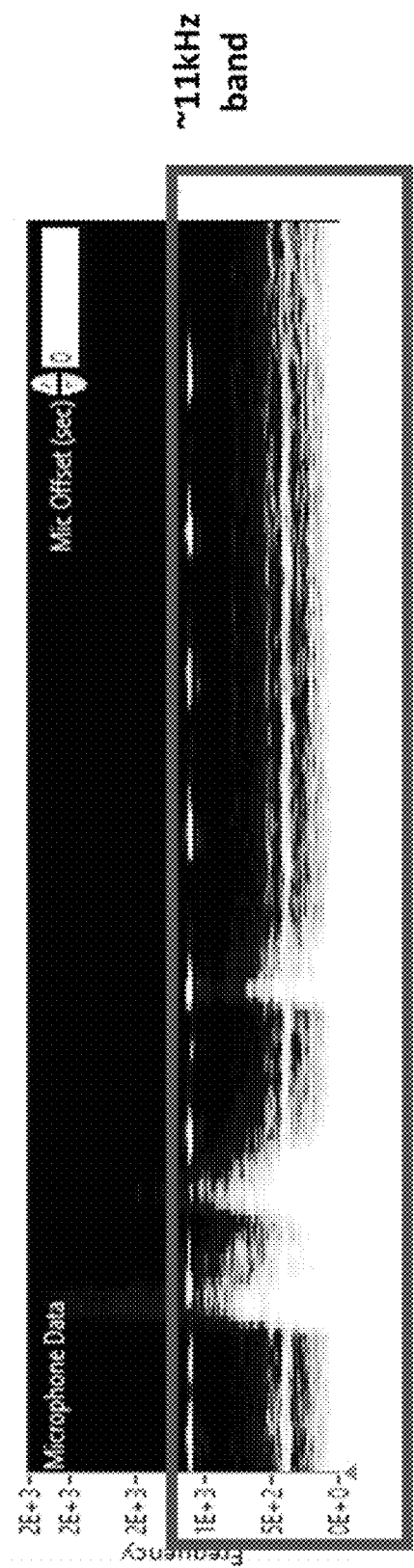
FIG. 8*e* illustrates a profile of sound signal readings in case of a failing conveyor belt bearing, according to an example embodiment of the present disclosure.

Similarly, FIG. 8e illustrates a profile of sound signal readings in case of a failing conveyor belt bearing, according to an example embodiment of the present disclosure. A failing conveyor belt 604 bearing may emit signal readings in a high frequency range as illustrated in FIG. 8(e). Therefore, the faulty bearing may emit sound that is continuous, and may thus cause the signal reading that resembles the plot illustrated in FIG. 8e.

Figure 8F:
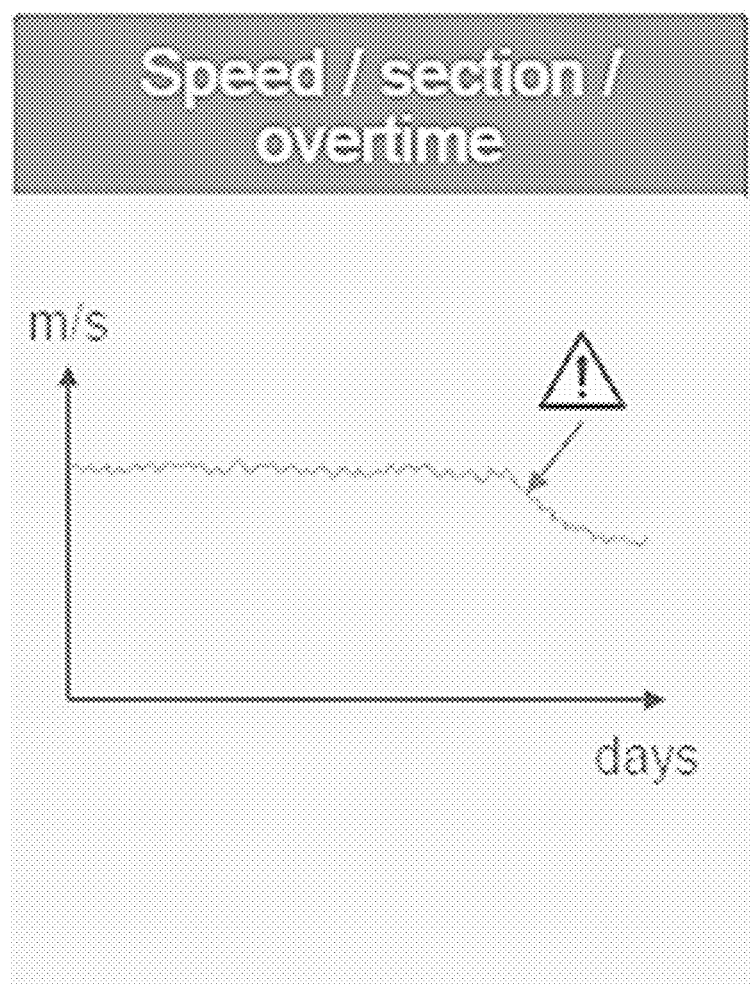
FIG. 8*f* illustrates a graph indicating a pattern of speed of the conveyor belt detected by the detector over a period of time, according to an example embodiment of the present disclosure.

FIG. 8f illustrates an example graph 810 indicating a pattern of the speed of the conveyor belt 604 detected by the speed sensor of the detector 106 over a period of time.

Referring back to FIG. 7a, the operational data detected by the detector 106 may be retrieved by the error detector 110 coupled to a processor, a main processing unit or a main processing gateway. The main processing gateway may provide the inspection system 102 with local processing capabilities. The error detector 110 coupled to the processor may compare the current operational trend data of the baggage handling system 104 with the historical operational trend data of the baggage handling system 104 retrieved over a period of time. Consequently, the error detector 110 may determine the error in operation of the baggage handling system 104 based on the comparison.

The inspection system 102 may be in communication with the intelligent baggage docking station 610 through a wireless connection or a wired connection. The data associated with the inspection system 102, such as version, type, drivers used, and the like, may be stored in a data analytics service 712 via the intelligent baggage docking station 610.

In an example embodiment, such as the operational data indicative of the current operational condition of the baggage handling system 104, from the BHS sensors 718 may be stored in the data analytics service 712. The existing BHS sensors 718 may include, but are not limited to, existing motor speed sensors of the conveyor belt 604. In such an example embodiment, the details of the inspection system 102 and the existing BHS sensors 718 may be stored in the data analytics service 712 through the Internet 720.

Further, users 714 may be able to access the information or the details of the inspection system 102 through a dashboard 716. The inspection system 102 may generate and deliver notifications for various events, for example, error detection, to the users 714 through the dashboard 716.

Figure 9A:
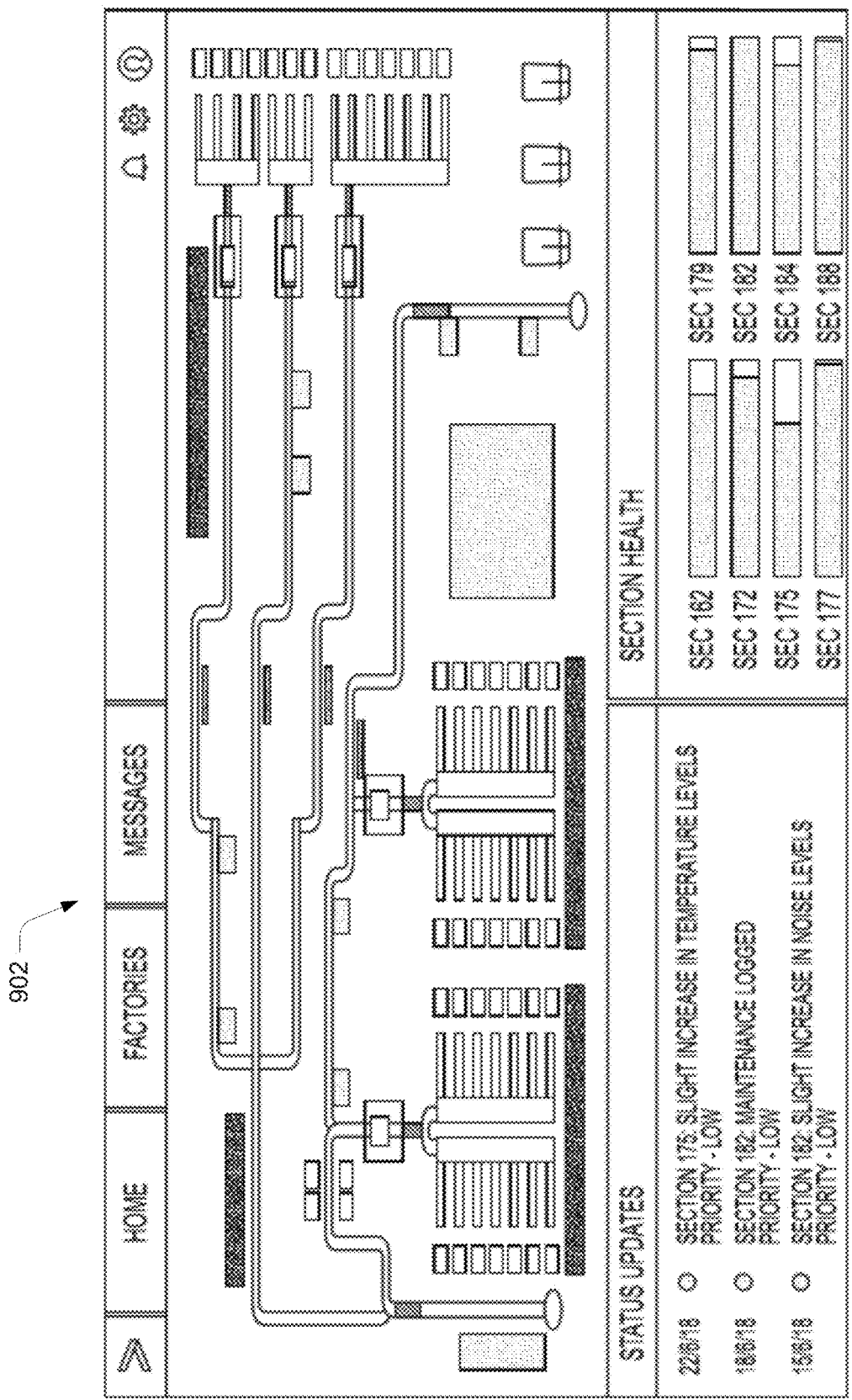
FIG. 9*a* illustrates a user interface to be displayed to a user through a dashboard, according to an example embodiment of the present disclosure.

FIG. 9a illustrates an example user interface 902 to be displayed to the user 714 through the dashboard 716, according to an example embodiment of the present disclosure. The user interface 902 may be understood as a notification dashboard. The user interface 902 may be overlaid with information related to notifications in the form of icons. This may indicate that events are detected for the area or section identified by an icon in the user interface 902, the area or section being a part of the baggage handling system 104. In an example embodiment, few or all icons may be selectable (e.g., clickable) to retrieve details in the form of a pop-up box. In an example, the user interface 902 may additionally indicate the general health of the baggage handling system 104 as determined by the error detector 110, in the manner described above. Such indication of the general system health can be used for optimizing the regular maintenance activities of the baggage handling system 104.

Figure 9B:
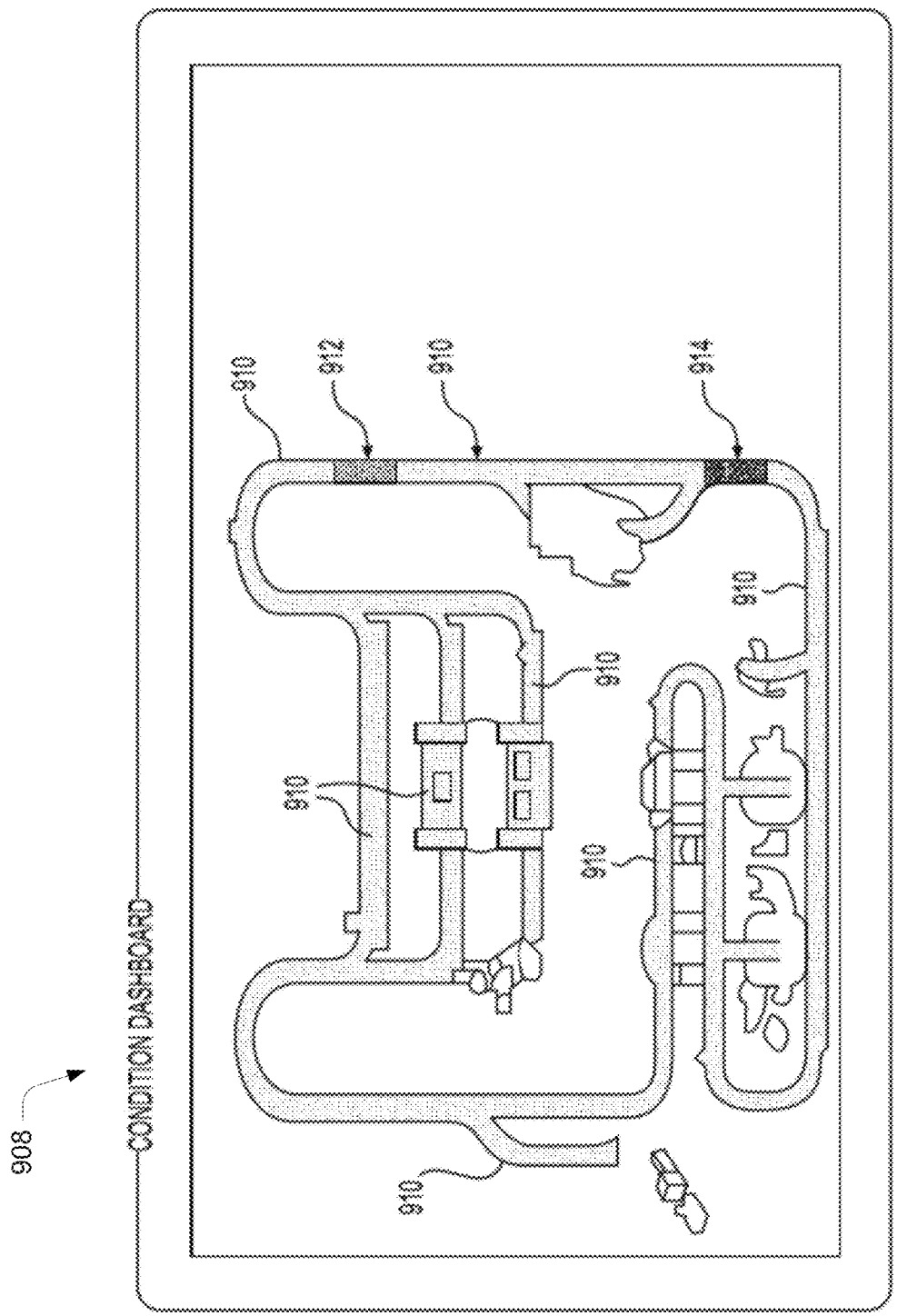
FIG. 9*b* illustrates a user interface to be displayed to the user through the dashboard, according to an example embodiment of the present disclosure.

FIG. 9b illustrates a user interface 908 to be displayed to the user 714 through the dashboard 716, according to an example embodiment of the present disclosure. The user interface 908 may be understood as a condition dashboard. The user interface 908 may be overlaid with color information indicating gradual drift in sensor readings in the section, which may indicate a section of the baggage handling system 104 that needs maintenance. In other words, sections 910 of the baggage handling system 104 which are not erroneous may be colored in green, indicating that they may not require maintenance in the next regular maintenance window. Therefore, these sections of the baggage handling system 104 do not have to be taken out of service. On the other hand, a section 912 that is trending towards error may be shaded yellow. Such a section can, therefore, be scheduled for maintenance in the near service term. Further, a section 914 that has already faltered can be indicated by red color and which can be scheduled for maintenance immediately. Accordingly, the baggage handling system 104 is serviced on an as-needed basis. Such a need-based maintenance scheduling may result in saving time and money, as fewer sections of the baggage handling system 104 will be taken out of service. At the same time, the different shades or colors of the sections allows a user to plan maintenance activity for the baggage handling system 104 given the condition indicated by the colors.

Figure 10:
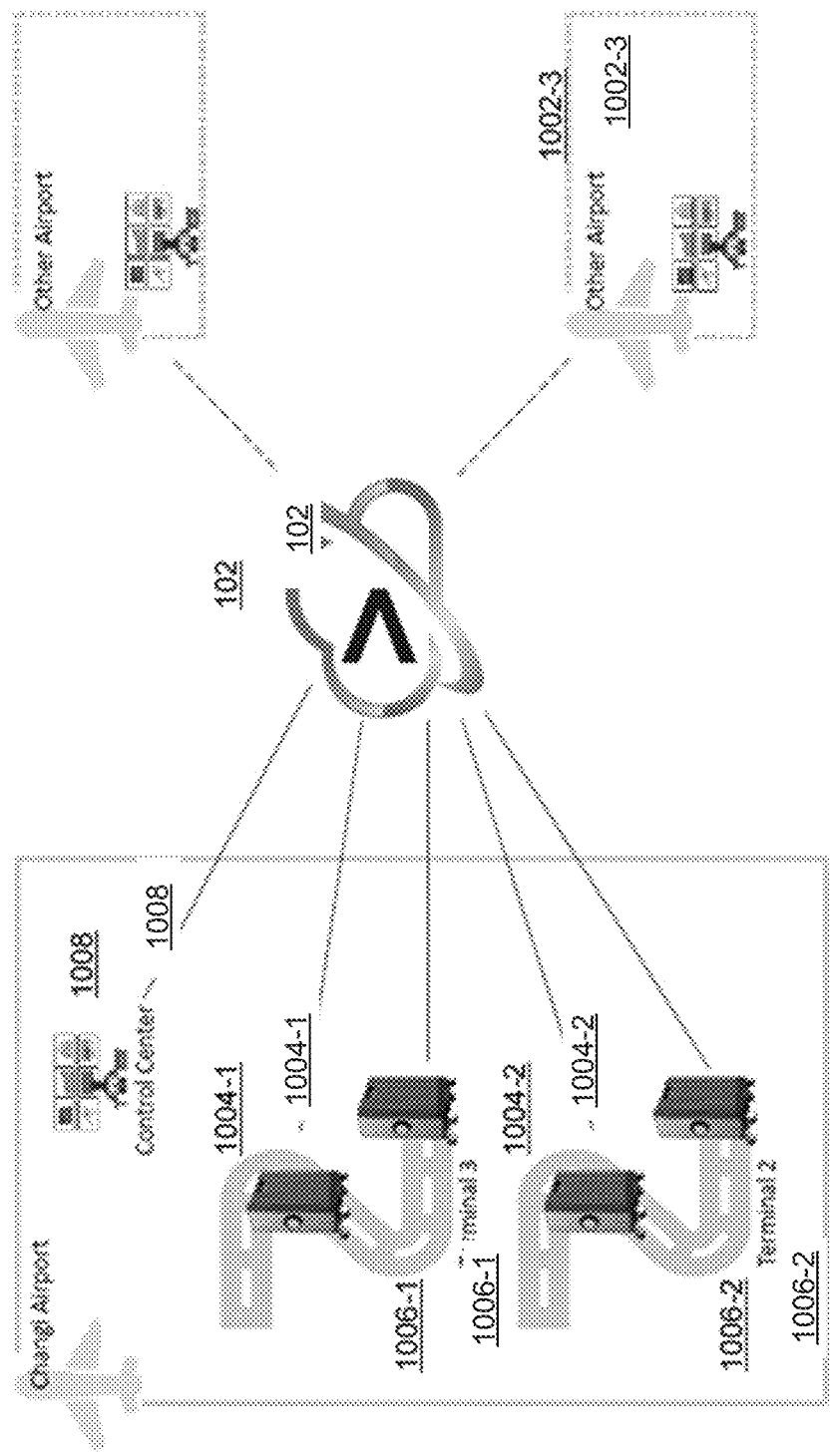
FIG. 10 illustrates a block diagram of the inspection system implemented for multiple airports, according to an example embodiment of the present disclosure.

FIG. 10 illustrates a block diagram of the inspection system 102 implemented for multiple airports 1002, according to an example embodiment of the present disclosure. The inspection system 102 may be implemented in an airport 1002-1, an airport 1002-2, and an airport 1002-3. The airport 1002-1 may include a first terminal 1004-1 and a second terminal 1004-2. The first terminal 1004-1 and the second terminal 1004-2 may include a baggage handling system 1006-1 and a baggage handling system 1006-2, respectively. The baggage handling system 1006-1 may carry a baggage 114-1 and a baggage 114-2. Similarly, the baggage handling system 1006-2 may carry a baggage 114-3 and a baggage 114-4. Further, a control center 1008-1 of the airport 1002-1 may include the intelligent baggage docking station 610 and the data analytics service 712 (shown in FIG. 6 and FIG. 7a, respectively).

The airport 1002-2 and the airport 1002-3 may additionally include similar terminals and baggage handling systems 104 carrying similar baggage 114. The airport 1002-2 and the airport 1002-3 may additionally include a control center 1008-2 and a control center 1008-3, respectively. The inspection system 102 may be in communication with the control center 1008-1, the control center 1008-2, and the control center 1008-3. Therefore, the inspection system 102 may retrieve the information from all the control centers 1008 for a more comprehensive analysis. The inspection system 102 may be provided with centralized processing capabilities due to the abovementioned cloud functionalities. Therefore, the inspection system 102, including its data analytics techniques described in the present disclosure can be implemented in a cloud or centralized platform as well, without departing from the scope of the present disclosure.

Although the inspection system 102 is explained with respect to a baggage handling system 104, the inspection system 102 can be implemented in other environment without departing from the scope of the present disclosure. For example, the inspection system 102 may be implemented to monitor public transport infrastructure. In particular, the condition of rail tracks or roads may be monitored by installing the detector 106 in trains or buses. Furthermore, vibration data and acoustic data collected from the trains or the buses may be used to monitor the operation of the trains and buses. The inspection system 102 may additionally be used to detect worn out train tracks or dangerous potholes on the roads. Similarly, the inspection system 102 may be implemented for the inspection and maintenance of elevators. In addition, the inspection system 102 can be used to detect errors in the assembly lines in factories.

Figure 11:
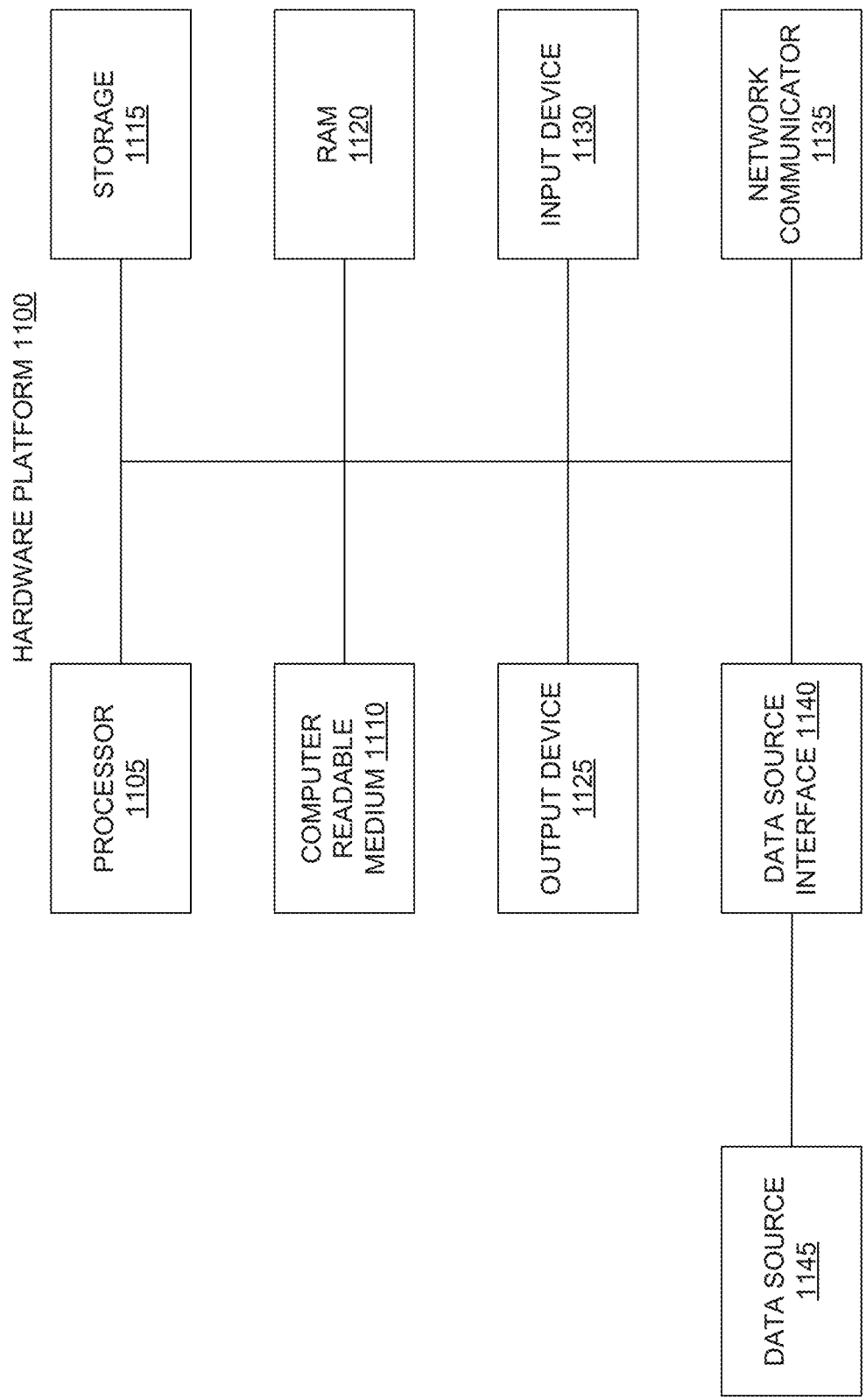
FIG. 11 a hardware platform for embodiment of the inspection system, according to an example embodiment of the present disclosure.

FIG. 11 illustrates a hardware platform 1100 for embodiment of the inspection system 102, according to an example embodiment of the present disclosure. Particularly, computing machines such as but not limited to internal/external server clusters, quantum computers, desktops, laptops, smartphones, tablets and wearables which may be used to execute the inspection system 102 or may include the structure of the hardware platform 1100. The hardware platform 1100 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over the FIG. 11, the hardware platform 1100 may be a computer system 1100 that may be used with the examples described herein. The computer system 1100 may represent a computational platform that includes components that may be in a server or another computer system. The computer system 1100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).The computer system 1100 may include a processor 1105 that executes software instructions or code stored on a non-transitory computer readable storage medium 1110 to perform methods of the present disclosure. The software code includes, for example, instructions to analyze operational data, detect an error, and generate notifications and alerts.

The instructions on the computer readable storage medium 1110 are read and stored the instructions in storage 1115 or in random access memory (RAM) 1120. The storage 1115 provides a large space for keeping static data where at least some instructions could be stored for later execution. The stored instructions may be further compiled to generate other representations of the instructions and dynamically stored in the RAM 1120. The processor 1105 reads instructions from the RAM 1120 and performs actions as instructed.

The computer system 1100 further includes an output device 1125 to provide at least some of the results of the execution as output including, but not limited to, visual information to the employees about the solution and response to their query. The output device 1125 can include a display on computing devices and virtual reality glasses. For example, the display can be a mobile phone screen or a laptop screen. GUIs and/or text are presented as an output on the display screen. The computer system 1100 further includes input device 1130 to provide a user or another device with mechanisms for entering data and/or otherwise interact with the computer system 1100. The input device may include, for example, a keyboard, a keypad, a mouse, or a touchscreen. In an example, output of a bot is displayed on the output device 1125. Each of these output devices 1125 and input devices 1130 could be joined by one or more additional peripherals.

A network communicator 1135 may be provided to connect the computer system 1100 to a network and in turn to other devices connected to the network including other clients, servers, data stores, and interfaces, for instance. The network communicator 1135 may include, for example, a network adapter such as a LAN adapter or a wireless adapter. The computer system 1100 includes a data source interface 1140 to access data source 1145. A data source is an information resource. As an example, a database of exceptions and rules may be a data source. Moreover, knowledge repositories and curated data may be other examples of data sources.

Figure 12:
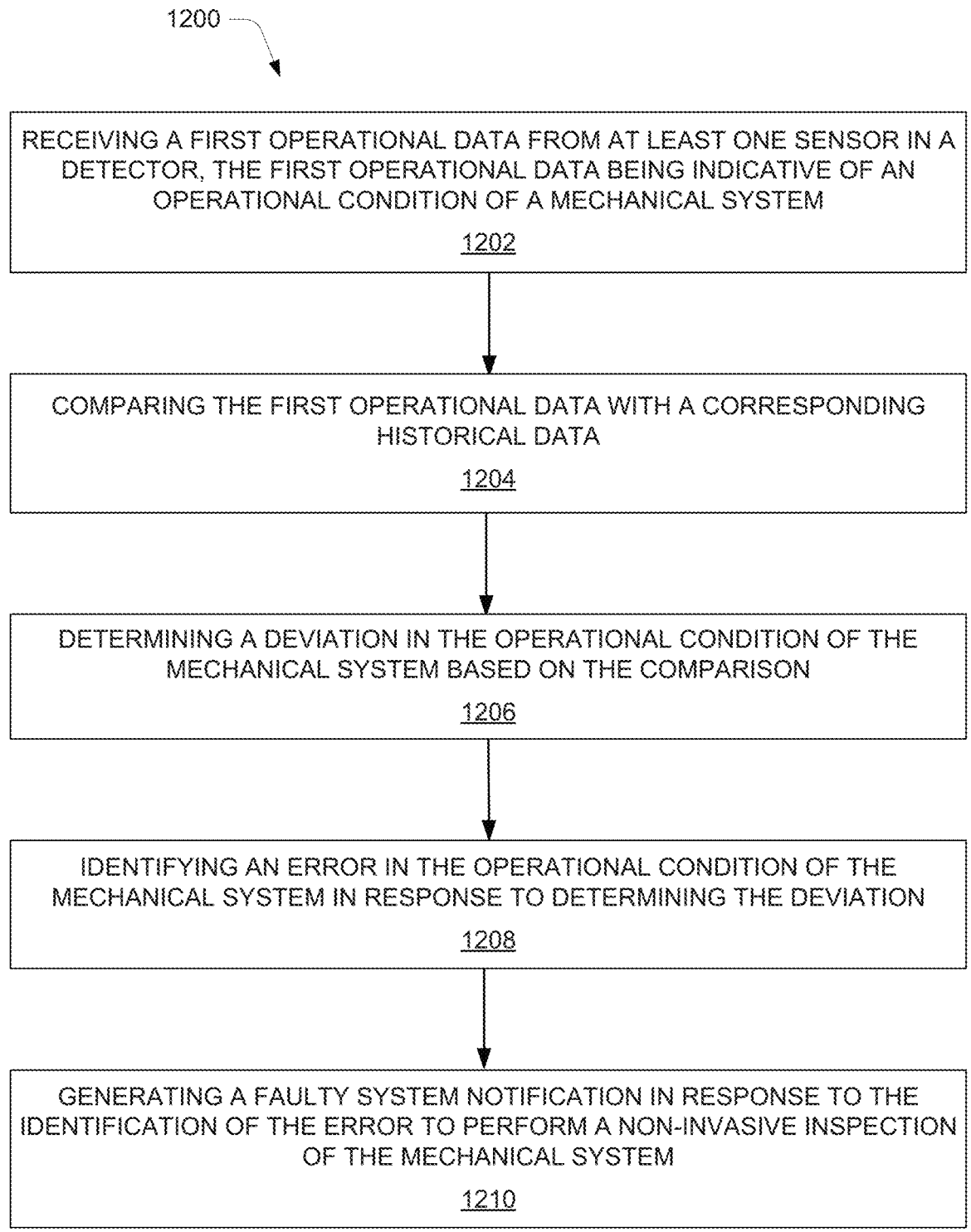
FIG. 12 illustrates a method for non-invasive inspection, according to an example embodiment of the present disclosure.

FIG. 12 illustrates a method 1200 for non-invasive inspection of a baggage handling system 104, in accordance with an example of the present disclosure.

At block 1202, a first operational data is received from one or more sensors in the detector 106. The first operational data can indicate a current operational condition of the baggage handling system 104 that is being inspected. The sensors in the detector 106 may include at least one of a video camera, an infrared camera, an odor sensor, a sound sensor, a temperature sensor, a speed sensor, a vibration sensor, and an RFID reader.

The video camera of the detector may detect and record a video footage of any activity happening around the baggage handling system. The infrared camera may detect infrared characteristics of the baggage handling system by scanning the surroundings. The odor sensor may determine any odor around the baggage handling system. This may include, for example, odor of the burning of a rubber strap of a conveyor belt of the baggage handling system. The sound sensor, the temperature sensor, and the vibration sensor may detect any sound, temperature, and vibrations of components of the baggage handling system, respectively. The speed sensor may detect a speed of a conveyor belt of the baggage handling system. The RFID reader may read the RFID tags disposed in the baggage handling system.

Accordingly, the first operational data may include at least one of the video footage recorded by the video camera, infrared patterns recorded by the infrared camera, smells detected by the odor sensor, sounds detected by the sound sensor, thermal patterns detected by the temperature sensor, the speed of a conveyor belt of the baggage handling system, the vibrations in the baggage handling system, and details pertaining to detection of the RFID tags by the RFID reader.

At block 1204, the first operational data is compared with a corresponding historical first operational data. At block 1206, a deviation is determined in the current operational condition of the baggage handling system 104 based on the comparison. In one example, as part of determining the deviation, an operational trend of the baggage handling system 104 is determined, based on the historical first operational data. In the present example, the operational trend can indicate a historical pattern in which the baggage handling system 104 has behaved. For instance, the operational trend may include a behavior of the mechanical system as recorded by one or more sensors in the detector that did not lead to an error. Accordingly, as part of determining the deviation, the deviation in operation of the baggage handling system 104 from the operational trend is determined, based on the comparison of the retrieved operational data and the operational trend.

In addition, based on the historical first operational data that indicates the operational trend of the baggage handling system 104, a threshold value for the first operational data for the sensor can be determined. In an example, the threshold value can be used for determining the deviation in the current operational condition of the baggage handling system 104 from the historical operational trend or the historical pattern.

At block 1208, an error in the current operational condition of the baggage handling system 104 is identified in response to the deviation being determined. The error so identified can be an imminent error, a likely error, or an occurred error. For instance, based on the operational trend of the baggage handling system 104 and the deviation thereof, a general health of the mechanical system can be determined which can be used to perform preventive maintenance.

In another example, the error so identified can be corroborated by taking operational data or readings from other sensors and determining whether the other sensors additionally corroborate the occurrence of the error. Accordingly, second operational data from at least one other sensor, interchangeably referred to as the second sensor, in the detector 106 can be retrieved and compared with corresponding historical second operational data, in the manner as described above. Further, based on the comparison, a deviation in the current operational condition of the baggage handling system 104 is determined which corroborates the identified error. In another example, operational data from two more sensors can be retrieved to perform the corroboration. As will be understood, the sensors and the operational data can be one from the examples provided with reference to the first operational data.

Further, as an example, to identify the section of the baggage handling system 104 that has the error, a position of the item in the baggage handling system 104 can be determined using a location sensor 108, a luggage report, variance data analysis technique, or a combination thereof.

In an example, method steps of block 1202-1208 pertaining to analysis of data and detection of errors may be performed by the error detector 110.

Further, at block 1210, a notification, such as a notification is generated in response to the identification of the error to perform a non-invasive inspection of the baggage handling system 104. In other examples, notifications may indicate general health of the baggage handling system 104. For example, the notification generator 112 may generate the notifications.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. An inspection system for non-invasive inspection, the inspection system comprising:
   a memory storing historical first operational data, the historical first operational data associated with a mechanical system;
   a detector including a first sensor and a second sensor, the detector being disposed on an item to be moved along the mechanical system to be inspected;
   an error detector in communication with the detector, wherein the error detector is to:
      retrieve first operational data from the first sensor in the detector, wherein the first operational data is indicative of a current operational condition of the mechanical system;
      retrieve the historical first operational data from the memory;
      compare the first operational data with the historical first operational data corresponding to the first sensor;
      determine a deviation in the current operational condition of the mechanical system based on the comparison, wherein the deviation in the current operational condition. is indicative of an error in the operation of the mechanical system;
      retrieve second operational data from the second sensor in the detector;
      compare the second operational data with historical second operational data corresponding to the second sensor; and
      determine a deviation in the current operational condition based on the comparison of the second operational data with historical second operational data to corroborate the error determined based on the first operational data; and
   a notification generator in communication with the error detector, the notification generator to generate a notification when the error is determined in the mechanical system.

2. The inspection system as claimed in claim I, wherein the first sensor comprises at least one of an image processing device, an infrared camera, an odor sensor, a sound sensor, a temperature sensor, a speed sensor, a vibration sensor, and a Radio Frequency Identification (RFID) reader.

3. The inspection system as claimed in claim 2, wherein the first operational data includes at least one of a video footage recorded by a video camera, infrared patterns recorded by the infrared camera, odors detected by the odor sensor, sounds detected by the sound sensor, thermal patterns detected by the temperature sensor, a speed of a conveyor belt of the mechanical system, vibrations in the mechanical system, and detection of an RFID tag by an RFID reader.

4. The inspection system as claimed in claim I further comprising:
   an intelligent baggage docking station to wirelessly communicate with the detector when the detector is within a detectable range of the intelligent baggage docking station,
   wherein the intelligent baggage docking station is to receive the first operational data from the detector and is to transmit the first operational data to the error detector.

5. The inspection system as claimed in claim 1, wherein the error detector is to:
   determine an operational trend of the mechanical system, based on the historical first operational data corresponding to the first sensor; and
   determine a deviation in an operation of the mechanical system from the operational trend based on the comparison of the first operational data and the operational trend, wherein the deviation beyond a threshold is indicative of the error in the mechanical system.

6. The inspection system as claimed in claim 1, thither comprising a user interface including a dashboard to one of:
   deliver the notification; and
   indicate a general health of the mechanical system, based on an operational trend of the mechanical system.

7. The inspection system as claimed in claim 1, wherein the inspection system further comprises a location sensor to determine a location of the item in the mechanical system, wherein the location of the item is indicative of the location of the error detected in the mechanical system.

8. A method comprising:
   receiving a first operational data from a detector coupled to an item being handled by a mechanical system, the detector comprising a first sensor and a second sensor, and the first operational data indicative of a current operational condition of the mechanical system;
   comparing the first operational data with a historical first operational data of the mechanical system corresponding to the first sensor;
   determining a deviation in the current operational condition of the mechanical system based on the comparison, wherein the deviation in the current operational condition is indicative of an error in the operation of the mechanical system;
   retrieving second operational data from the second sensor in the detector:
   comparing the second operational data with historical second operational data corresponding to the second sensor;
   determining a deviation in the current operational condition based on the comparison of the second operational data with historical second operational data to corroborate the error determined based on the first operational data; and
   generating a notification in response to determining the error to perform a non-invasive inspection of the mechanical system.

9. The method as claimed in claim 8, wherein the determining comprises:
  ascertaining an operational trend of the mechanical system, based on the historical first operational data; and
  identifying the error in the current operational condition of the mechanical system from the operational trend based on the comparison of the first operational data and the operational trend.

10. The method as claimed in claim 9, wherein the determining comprises determining a threshold value for the first operational data pertaining to the first sensor, based on the operational trend, the threshold value being for determining a deviation in the current operational condition of the mechanical system from the operational trend to determine the error.

11. The method as claimed in claim 8, wherein the determining comprises ascertaining a position of the item in the mechanical system using at least one of a location sensor, a luggage report, and variance data analysis technique.

12. The method as claimed in claim 8, wherein the error is one of an imminent error, a likely error, and an occurred error.

13. A no transitory computer readable medium including machine readable instructions that are executable by a processor to:
  receive a first operational data from a detector coupled to an item being handled by a mechanical system,
    the detector comprising a first sensor and a second sensor, and
    the first operational data indicative of a current operational condition of the mechanical system;
  compare the first operational data with a historical first operational data of the mechanical system corresponding to the first sensor;
  determine a deviation in the current operational condition of the mechanical system based on the comparison, wherein the deviation in the current operational condition is indicative of an error in the operation of the mechanical system;
  retrieve second operational data from the second sensor in the detector;
  compare the second operational data with historical second operational data corresponding to the second sensor; and
  determine a deviation in the current operational condition based on the comparison of the second operational data with historical second operational data to corroborate the error determined based on the first operational data; and
  generate a notification in response to determining the error to perform a non-invasive inspection of the mechanical system.

14. The non-transitory computer readable medium as claimed in claim 13, wherein the processor is to:
  ascertain an operational trend of the mechanical system, based on the historical first operational data; and
  identify the error in the current operational condition of the mechanical system from the operational trend based on the comparison of the first operational data and the operational trend.

15. The non-transitory computer readable medium as claimed in claim 14, wherein the processor is to determine a threshold value for the first operational data pertaining to the first sensor, based on the operational trend, the threshold value being for determining a deviation in the current operational condition of the mechanical system from the operational trend to determine the error.

16. The non-transitory computer readable medium as claimed in claim 14, wherein the processor is to indicate a general health of the mechanical system to perform preventive maintenance.

17. The non-transitory computer readable medium as clai veil in claim 13, wherein the error is one of an imminent error, a likely error, and an occurred error.

* * * * *

UNITED STATES PATENT AND TRADEMARK OFFICE
CERTIFICATE OF CORRECTION

PATENT NO. : 11,479,416 B2
APPLICATION NO. : 16/180789
DATED : October 25, 2022
INVENTOR(S) : Christian Martono and Teck Leng Neo It is certified that error appears in the above-identified patent and that said Letters Patent is hereby corrected as shown below:

In the Claims

Claim 1, Column 19, Line 45, the phrase "condition.is indicative" should instead read "condition is indicative".

Claim 2, Column 19, Line 61, the phrase "claim I" should instead read "claim 1".

Claim 4, Column 20, Line 8, the phrase "claim I" should instead read "claim 1".

Claim 6, Column 20, Line 29, the phrase "claim1, thither" should instead read "claim 1, further".

Claim 8, Column 20, Line 55, the phrase "in the detector:" should instead read "in the detector;".

Claim 13, Column 21, Line 23, the phrase "A no transitory" should instead read "A non-transitory".

Claim 17, Column 22, Line 2 and Line 3, the phrase "as clai veil" should instead read "as claimed".

Signed and Sealed this
First Day of August, 2023

Katherine Kelly Vidal
*Director of the United States Patent and Trademark Office*